(12) United States Patent
Larkin

(10) Patent No.: US 9,037,729 B2
(45) Date of Patent: May 19, 2015

(54) SIP SERVER OVERLOAD CONTROL

(75) Inventor: Nicholas Peter Larkin, Enfield (GB)

(73) Assignee: METASWITCH NETWORKS LTD., Enfield (GB)

( * ) Notice: Subject to any disclaimer, the term of this patent is extended or adjusted under 35 U.S.C. 154(b) by 147 days.

(21) Appl. No.: 13/546,550

(22) Filed: Jul. 11, 2012

(65) Prior Publication Data

US 2013/0179581 A1    Jul. 11, 2013

(30) Foreign Application Priority Data

Jul. 11, 2011 (GB) .................... 1111838.7

(51) Int. Cl.
*G06F 15/16* (2006.01)
*H04L 29/06* (2006.01)
*G06F 11/00* (2006.01)
*H04L 12/28* (2006.01)

(52) U.S. Cl.
CPC ........ *H04L 65/1069* (2013.01); *H04L 65/1006* (2013.01); *H04L 65/1016* (2013.01); *H04L 65/105* (2013.01); *H04Q 2213/13164* (2013.01); *H04Q 2213/13204* (2013.01); *H04Q 2213/13348* (2013.01); *H04Q 2213/13389* (2013.01)

(58) Field of Classification Search
None
See application file for complete search history.

(56) References Cited

U.S. PATENT DOCUMENTS

| | | | |
|---|---|---|---|
| 7,522,581 B2 | 4/2009 | Acharya et al. | |
| 7,680,139 B1 * | 3/2010 | Jones et al. | 370/414 |
| 7,801,129 B2 * | 9/2010 | Batteram et al. | 370/389 |
| 7,869,364 B2 | 1/2011 | Griffith et al. | |
| 8,054,826 B2 * | 11/2011 | Cheng et al. | 370/352 |
| 8,310,958 B2 * | 11/2012 | Crable et al. | 370/259 |
| 8,424,086 B2 * | 4/2013 | Goldman et al. | 726/22 |
| 2004/0184462 A1 * | 9/2004 | Narayanan et al. | 370/395.21 |
| 2007/0206620 A1 * | 9/2007 | Cortes et al. | 370/412 |
| 2012/0174217 A1 * | 7/2012 | Ormazabal | 726/22 |

* cited by examiner

Primary Examiner — Wen-Tai Lin
(74) Attorney, Agent, or Firm — EIP US LLP

(57) ABSTRACT

There is provided a system, method and computer program product for managing network communications to a Session Initiation Protocol (SIP) server. In the system, a packet limiter receives packets relating to SIP messages from a network and selectively forwards said packets for initial SIP processing. A work scheduler then accesses the result of the initial SIP processing and determines whether to proceed with further SIP processing based on a level of system activity. If a level of system activity is such that the system should proceed with further SIP processing, then further SIP processing may be scheduled. Initial SIP processing may involve one or more of parsing, request handling and response handling. Further SIP processing may involve one or more of initiating a new dialog, processing SIP messages relating to an existing dialog and processing messages that do not require a dialog.

16 Claims, 14 Drawing Sheets

SIP SERVER OVERLOAD CONTROL

CROSS-REFERENCE TO RELATED APPLICATIONS

This application claims priority to foreign Patent Application No. GB 1111838.7, filed on Jul. 11, 2011, the disclosure of which is incorporated herein by reference in its entirety.

FIELD OF THE INVENTION

The present invention relates to the field of network communications. In particular, but not exclusively, the present invention relates to the management of communications received by a Session Initiation Protocol (SIP) server.

BACKGROUND OF THE INVENTION

SIP is a standardised signalling protocol for controlling communication sessions over a network. It enables sessions with one or more participants to be created, modified and/or terminated and it is widely used to control multimedia communications over Internet Protocol (IP) networks. For example, it can be used to control Voice over IP (VoIP) communications, instant messaging, chat, games and video communications between multiple entities, supporting both unicast and multicast sessions. It is also used as the signalling protocol in 3rd Generation Partnership Project (3GPP) standards such as the IP Multimedia Subsystem (IMS) architecture.

SIP is an application layer protocol and as such is designed to be used independently of underlying transport protocols. Its syntax is text-based and is modelled on that of HyperText Transfer Protocol (HTTP). SIP services are provided by SIP servers. A SIP server is typically a computing device configured to receive and process SIP messages. SIP messages comprise either a request or a response. A SIP transaction comprises a request that is sent to a SIP server and that invokes a particular method or function on the server. This method or function then results in a response which is sent by the SIP server in reply to the request. SIP servers may comprise, amongst others, logical end-points, known as "user agents", proxy servers, redirect servers, registration servers and/or gateway devices such as session border controllers. User agents create and/or receive SIP messages. User agents may be software-based, for example a so-called "softphone" operating on a personal computer, or may comprise an embedded system forming part of a hardware device such as an IP phone. Proxy servers are typically used to route SIP requests. Redirect and registration servers support user mobility. Session border controllers control signalling between two networks. SIP servers may be coupled to a Plain Old Telephone Service (POTS) using a media gateway.

An example of a SIP transaction will now be described with reference to FIG. 1. FIG. 1 shows an exemplary SIP infrastructure 100. FIG. 1 shows two user agents: a softphone implemented on a laptop computer 110 and a SIP phone 150. FIG. 1 also shows three SIP servers: a first SIP proxy server 120, a SIP registration server 130 and a second SIP proxy server 140. The elements of FIG. 1 may be connected via one or more networks such as the Internet.

FIG. 1 also shows an exemplary procedure for placing a voice "call" using SIP messages. Assume softphone 101 and SIP phone 150 are operated by two users: A and B. Both A and B have corresponding SIP Universal Resource Identifiers (URIs). These URIs are used to make a call and may resemble an email address with a username and a host name. A URI may be mapped to a physical device using a registration procedure. In FIG. 1, B sends a REGISTER request 200 to SIP registration server 130, the request identifying B's URI and an address of SIP phone 150. In response to the REGISTER request, the SIP registration server 130 associates B's URI with the address of the SIP phone 150, such that the second proxy server 150 knows to locate B at SIP phone 150. The address may be an IP address. The SIP registration server 130 responds with an acknowledgement 201.

To place a call A sends an INVITE request 205 with B's URI to the first SIP proxy server 120. The first SIP proxy server 120 resolves the host name in B's URI and forwards an INVITE request 206 to the second SIP proxy server 140, which may be located based on the host name in B's URI. On receipt of the INVITE request 206, the second SIP proxy server 140 may make use of SIP registration server 130 to locate user B, as shown by messages 207 and 208. Further location services may also be used to locate B. The SIP registration server 130 may inform the second SIP proxy server 140 that user B is located at SIP phone 150, enabling it to forward the INVITE request 209 to SIP phone 150. Each SIP proxy server 120 also sends a "Trying" response (not shown) in reply to each INVITE request and a "Ringing 180" response may be sent to A via the two SIP proxy servers 120 and 130 indicating that B's SIP phone 150 is ringing. If B answers SIP phone 150, an OK response is sent to A via the two SIP proxy servers 120 and 130, enabling a media session 220 to be set up between the softphone 110 and SIP phone 150. As SIP is a signalling protocol, media sessions are set up using an appropriate media transfer protocol, typically Real-time Transport Protocol (RDP) over User Datagram Protocol (UDP) or Transmission Control Protocol (TCP).

In the example of FIG. 1, communications 200 to 212 comprise SIP messages. SIP messages may comprise headers and values, all specified as strings. The body of a SIP message may contain a description of a session, for example using a format specified by the Session Description Protocol (SDP). Encryption may also be used, which is referred to as SIPS.

SIP servers are often exposed to large numbers of SIP messages. For example, a typical call volume may be millions of calls per hour, where each call typically requires multiple SIP messages. In certain circumstances, a SIP server may be exposed to higher than average SIP message volumes. For example, a popular live television programme may provide a time-limited telephone voting service; this may result in a sudden increase in call volumes, a so-called "mass calling" event. In this case, the increased traffic is legitimate, i.e. it does not relate to a malicious attack, and so a SIP server must invest its limited resources such that the lowest number of users experience disruptions in service.

Alternatively, a SIP server could be exposed to a malicious Denial of Service (DoS) attack. In this case, malicious parties may purposefully direct a large number of illegitimate messages toward a server. The aim of a DoS attack is often to overload a SIP server: the processing resources of the server are directed to handling the large number of illegitimate messages at the expense of messages from legitimate users. This may result in a loss of service, poor call quality or delays to legitimate users. DoS attacks may be distributed, so-called Distributed Denial of Service (DDoS) attacks. In this case, a malicious party may infect a plurality of computing devices with code that adapts the computing devices to send illegitimate messages towards the SIP server. This results in a high volume of SIP messages that originate from a large number of sources. It is not unusual for hundreds of thousands of computing devices to be infected in this way, resulting in illegitimate messages originating from a diverse set of network addresses. If illegitimate messages are received from a wide spectrum of IP addresses it may be difficult to distinguish illegitimate and legitimate traffic based on the message source. This is compounded by the design of the network stack: IP routers, IP processing software and IP processing hardware deliver packets independently of specific users and without any concept of "legitimacy" or "illegitimacy". Typically, a packet containing a SIP message will only be deemed "legitimate" or "illegitimate" following SIP authentication, with "illegitimate" messages failing the authentication. However, by this time a SIP server has already committed resources to IP processing and initial SIP parsing and processing. A malicious party can thus disrupt the service provided by a SIP server by hijacking, and overloading, this lower level processing.

There have been efforts in the art to manage an overloaded SIP server.

U.S. Pat. No. 7,522,581 B2 describes a classification algorithm that is applied to incoming SIP messages. Following classification a SIP message may be assigned to one of a plurality of queues for SIP processing. Each queue may represent a priority. Messages in a high priority queue may be processed before messages in a low priority queue.

U.S. Pat. No. 7,869,364 B2 describes a SIP server with a plurality of server states. The SIP server may be placed in a particular state according to the value of a monitored resource metric. Received SIP messages may be sorted into "call processing" or "non-call processing" queues and handled appropriately, depending on the server state.

Both these solutions require additional processing and bespoke SIP server systems. This may make them difficult to apply to existing implementations. The additional processing may require increased lower level processing when subject to overload conditions. This makes these solutions less effective when subject to DoS or DDoS attacks. As each solution presents a compromise for allocation of limited server resources, they may also be sub-optimal for dealing with both malicious attacks and large quantities of legitimate traffic.

It is therefore desirable to provide a method and system for managing SIP messages that overcomes the problems associated with server overload and/or malicious attacks and that offers an improvement on known solutions.

SUMMARY OF THE INVENTION

In accordance with an example, there is provided a system for managing network communications to a Session Initiation Protocol (SIP) server, comprising a packet limiter arranged to receive packets relating to SIP messages from a network and selectively forward said packets for initial SIP processing and a work scheduler arranged to access the result of the initial SIP processing of the packets forwarded by the packet limiter and determine whether to proceed with further SIP processing based on a level of system activity.

In accordance with another example, there is provided a method for managing network communications to a Session Initiation Protocol (SIP) server, comprising receiving a plurality of packets relating to SIP messages from a network, selectively forwarding one or more of said plurality of packets for initial SIP processing, performing initial SIP processing of said one or more forwarded packets, determining whether to proceed with further SIP processing based on a level of system activity and if so, scheduling further SIP processing.

In accordance with another example, there is provided a computer program product comprising a non-transitory computer-readable storage medium having computer readable instructions stored thereon, the computer readable instructions being executable by a computerized device to cause the computerized device to perform the method described above.

Further features and advantages will become apparent from the following description of certain examples, which is made with reference to the accompanying drawings.

DETAILED DESCRIPTION

Figure 1:
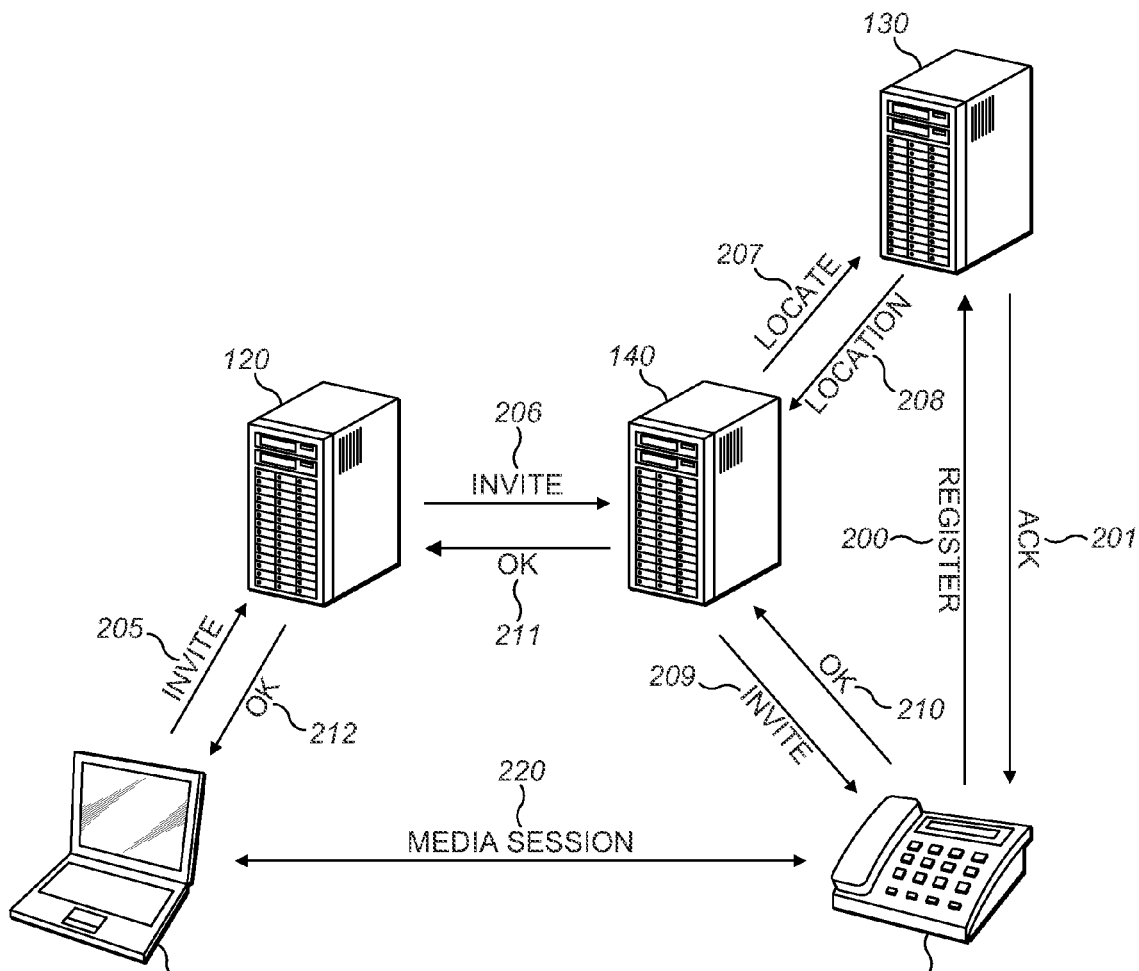
FIG. 1 is a schematic diagram showing a SIP transaction.

Examples of the present invention provide methods and systems for managing SIP communications that avoid overloading a SIP server and that may counter DoS or DDoS attacks. The examples comprise components that are implemented before SIP processing takes place to filter and discard incoming packets before they present a drain on system resources. The examples seek to control which data packets are passed on to higher levels of a network stack. They provide intelligent solutions to the problem of server overload and are designed to be easily retrofitted to existing implementations. Two examples are described separately in the following text; however, the two examples may be combined with synergetic results.

Certain examples have an advantage of preventing overload of a SIP server in a manner that may be retrofitted to existing SIP server implementations. A packet limiter and work scheduler work in unison at different levels of network processing to avoid protocol timeouts and indiscriminate packet dropping. Further advantages are set out in the detailed description below. Further SIP processing may comprise, for example, initiating a new dialog, processing SIP messages relating to an existing dialog and/or processing messages that do not require a dialog. Initial SIP processing may comprise parsing and/or request and/or response handling. The result of the initial SIP processing may comprise pending requests and/or response.

In some examples, the system may further comprise a packet classifier communicatively coupled between a network connection and the packet limiter, the packet classifier arranged to inspect a packet received via the network connection and assign a priority to said packet.

In some examples, the system may further comprise a priority rule programmer arranged to provide one or more classification rules for use by the packet classifier in classifying a packet and assigning a priority.

In some examples, the packet limiter may be arranged to selectively forward packets for initial SIP processing based on the priorities assigned by the packet classifier.

In some examples, the packet classifier may be adapted to set data in a packet indicating the priority of the packet.

In some examples, the work scheduler may be arranged to use the priorities of packets to determine whether to proceed with further SIP processing based on a level of system activity.

In some examples, a packet identifies a source and the packet limiter is arranged to selectively forward packets from a first set of one or more sources in preference to packets from a second set of one of more sources.

In some examples, a ratio of a number of sources in the first set to a number of sources in the second set is selected based a ratio of packets forwarded by the packet limiter to packets received by the packet limiter.

In some examples, the packet limiter may be arranged to reassign sources to the first set and the second set following a time interval.

In some examples, the packet limiter may be arranged to apply a hash function to a source network address and/or port number of a packet in order to map a source to one of the first and second sets.

In some examples, the work scheduler may be arranged to, based on a current level of system activity, determine whether a new item of work can be scheduled for initiation in a time period, and, if the new item of work process cannot be scheduled for initiation in the time period, send a busy response.

In some examples, the packet limiter may be arranged to discard packets that are not selectively forwarded for initial SIP processing.

In some examples, the initial SIP processing comprises parsing one or more packets to identify a SIP request and the further SIP processing comprises one or more of proceeding with a SIP transaction following the SIP request and proceeding with a SIP dialog following the SIP request.

In some examples, following a step of receiving a plurality of inbound packets, a method may comprise classifying the received packet and assigning priorities to the received packets based on said classifying.

In some examples, a step of selectively forwarding one or more of said plurality of packets for SIP processing may comprise selectively forwarding one or more packets for SIP processing based on the assigned priorities.

In some examples, a step of classifying the received packets may comprise setting data within a received packet to indicate its priority.

In some examples, a step of scheduling further SIP processing may comprise scheduling a new item of work in preference to a second item of work if at least one priority of one or more packets relating to the first item of work is higher than at least one priority of one or more packets relating to the second item of work.

In some examples, a packet identifies a source and a step of selectively forwarding one or more of said plurality of packets comprises selectively forwarding packets from a first set of one or more sources in preference to packets from a second set of one of more sources.

In some examples, a ratio of a number of sources in the first set to a number of sources in the second set is selected based a ratio of forwarded packets to received packets.

In some examples, a method may comprise reassigning sources to the first set and the second set following a given time interval.

In some examples, a method may comprise applying a hash function to a source network address and/or port number of a packet in order to map a source to one of the first and second sets.

In some examples, a step of determining whether to proceed with further SIP processing may comprise determining whether there are sufficient system resources to initiate a new item of work in a time period and, if the new item of work cannot be initiated in the time period, sending a busy response.

In some examples, a step of selectively forwarding packets for initial SIP processing may comprise discarding packets that are not selectively forwarded for initial SIP processing.

In some examples, initial SIP processing may comprise parsing one or more packets to identify a SIP request and the further SIP processing may comprise one or more of proceeding with a SIP transaction following the SIP request and proceeding with a SIP dialog following the SIP request.

To better explain the examples a short discussion of network processing will be provided. In network engineering a number of abstraction layers are defined to manage the complexities of network communications. Protocols are defined independently for each layer and each layer represents a different level of system function. A given layer provides network services to a layer above while receiving services from a layer below. A well known model is the Open Systems Interconnection (OSI) model that specifies seven layers: the physical layer, the data link layer, the network layer, the transport layer, the session layer, the presentation layer and the application layer. Another well known model is the Internet or TCP/IP model. Depending on the reference source, this model contains four or five layers that approximately map onto OSI layers. According to the Internet Engineering Task Force (IETF) Request for Comments (RFC) memorandum 1122, the layers comprise: the link layer, the Internet layer, the transport layer and the application layer. The Internet layer generally maps to the OSI network layer and the application layer generally maps to the OSI session, presentation and application layers, with certain session layer functionality being included in the transport layer.

Figure 2:
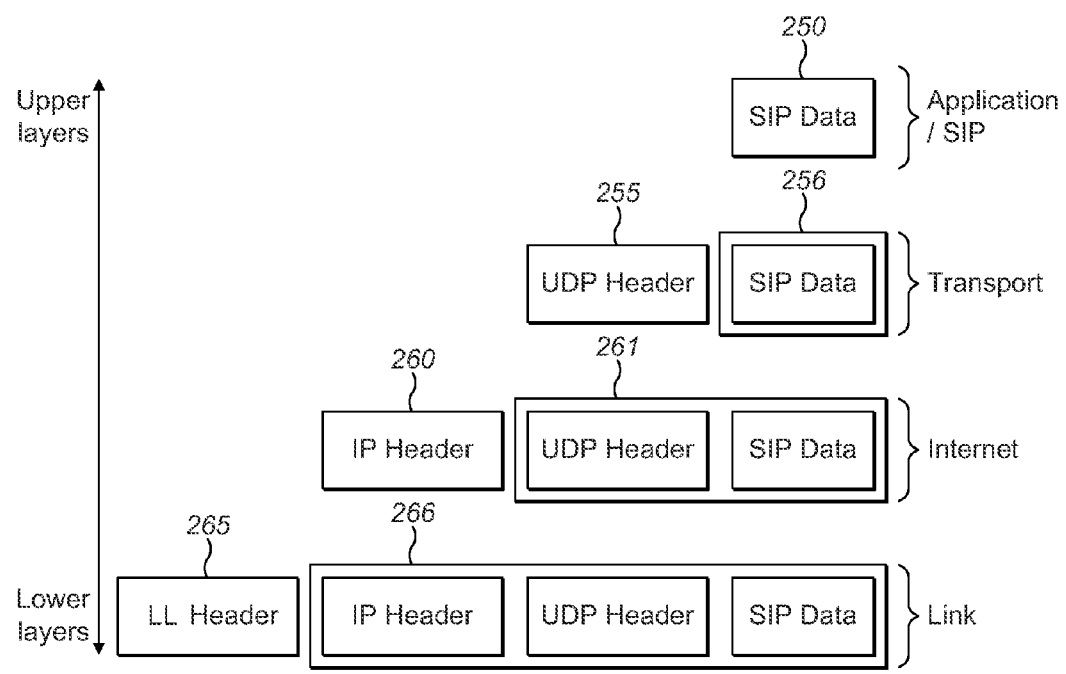
FIG. 2 is a schematic diagram showing data encapsulation across different layers of a network model.

FIG. 2 shows an example of data encapsulation when using network protocols that conform to the Internet model. As SIP is an application layer protocol a SIP message comprises data at the application level, as shown by SIP Data 250. For this reason the application layer may be referred to as the SIP layer in the following description. As an example, SIP data 250 may comprise the following text for a REGISTER request:

REGISTER sip: testdomain.com SIP/2.0
From: sip: bob@testdomain.com
To: sip: bob@testdomain.com
Contact: sip: 199.40.60.195
Expires: 3600.

This registers user "bob" at IP address "199.40.60.195". This registration lasts for 3600 time units.

A SIP message is typically prepared by a SIP application and is passed to one or more protocol services for transmission across a communications link. These services may be provided by specific applications, an operating system or dedicated hardware. In the example of FIG. 2, UDP is used as the transport layer protocol and so the SIP Data 250 is packaged as a UDP datagram comprising a UDP header 255 and UDP data 256. The UDP header comprises control information in the form of a source port number, a destination port number, a length of the datagram and a checksum. These fields of the UDP header are of fixed length (16 bits each). Following encapsulation at the transport layer, the UDP datagram is passed to the Internet layer. In the example of FIG. 2, the Internet layer protocol is IP (either version 4: IPv4 or version 6: IPv6). As such, the UDP datagram is packaged as IP data 261 within an IP packet that additional includes IP header 260. The IP header 260 comprises, amongst other fields, a source and destination IP address. The IP packet is then passed to a suitable network protocol at the link layer. The protocol applied at the Link Layer (LL) may then apply an appropriate header. For fixed line networks this may be, for example, Ethernet protocol. For wireless networks, this may be a protocol according to Institute of Electrical and Electronics Engineers' (IEEE) 802.11 set of standards. Taking the Ethernet protocol as an example, the IP packet may be packaged as an Ethernet frame, which includes frame data portion 266 and a frame header 265. The frame may also include a frame footer (not shown), which provides a cyclic redundancy check. A frame is typically packaged using low level operating system services in combination with network hardware, such as an Ethernet card/module. Once packaged, the frame may be sent over an Ethernet network to a receiving device. The receiving device can process the received frame, i.e. unpackage SIP data 250, using corresponding protocol services at each layer.

Figure 3:
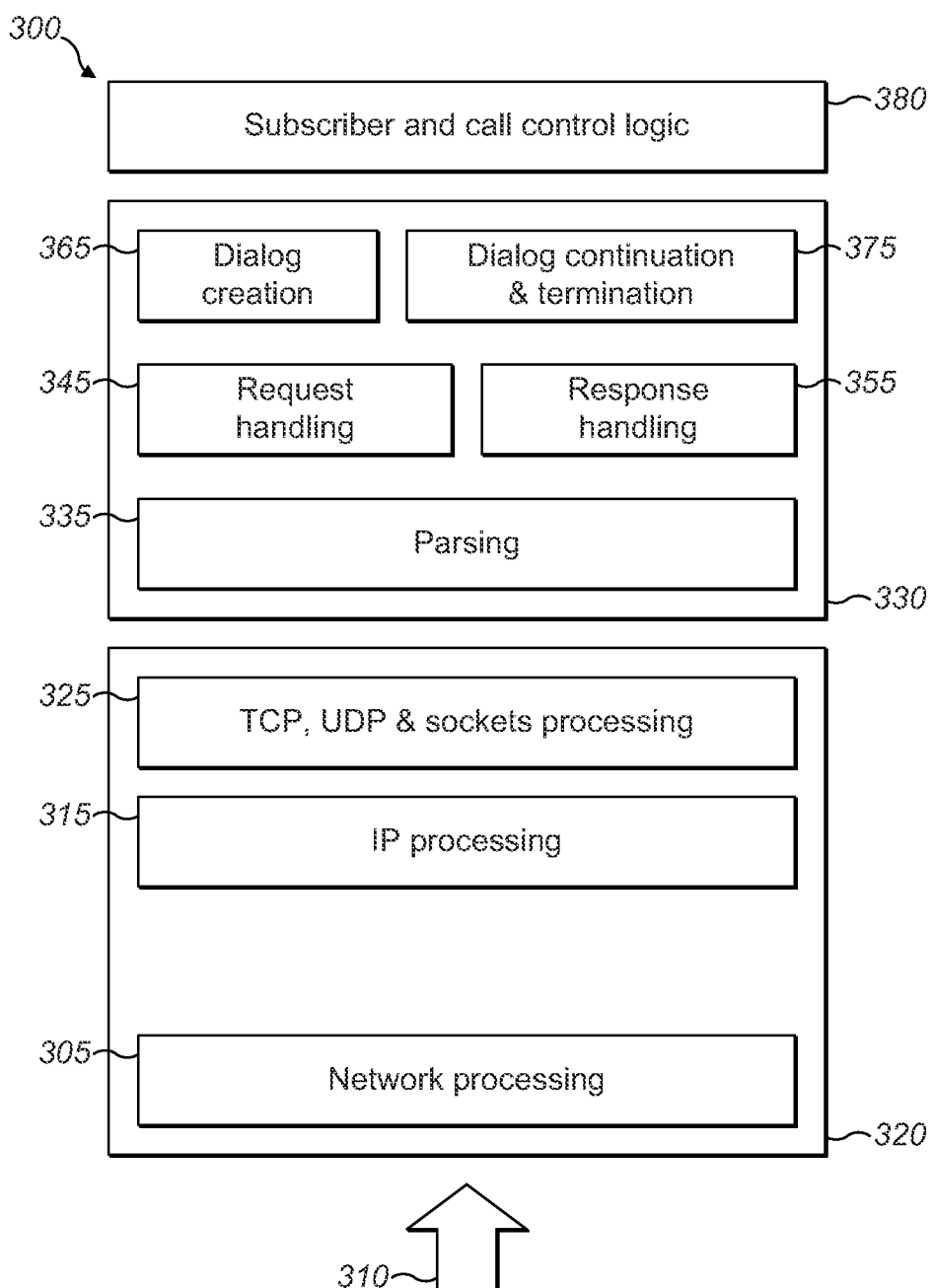
FIG. 3 is a schematic diagram showing components of a SIP server.

FIG. 3 is a schematic diagram of components of a SIP server 300. The SIP server 300 may comprise, amongst others, a session border controller (SBC), a SIP proxy server, a SIP redirect server, a SIP registration server and/or a user agent. The components shown are provided for example only, depending on the implementation requirements additional components may be provided, components may be functionally combined, or components may be omitted. One skilled in the art would understand that the functionality offered by one or more of the components described herein, including those that form part of the examples, may be provided: by computer program code arranged to be stored in working memory and be processed by one or more processors; or by programmable electronics such as Field Programmable Gate Arrays or other programmable integrated circuits such as those comprising programmable read-only memory (ROM); or by fixed electronic circuitry; or by a combination of program code and dedicated circuitry, for example as found in many embedded systems such as network routers with loadable firmware.

FIG. 3 comprises an IP stack 320, a SIP stack 330 and a SIP application 380. Each stack comprises components arranged to perform network processing at different layers in the Internet model. In this example, the IP stack 320 comprises components that interface with network hardware to provide services at the link, Internet and transport layers of the Internet model. Inbound data packets are received over a network connection by a network adaptor illustrated by arrow 310. For example, if the SIP server 300 is connected to an Ethernet connection the packets may be received over a physical cable connected to an Ethernet port. Network processing component 305 provides services relating to retrieving data from the network adapter, for example unpackaging an Ethernet frame at the link layer and providing an IP packet for further processing. It may comprise interface services that form part of an operating or embedded system. Network processing may comprise, amongst other functions, error checking and correction, network traffic control and demodulating. IP processing component 315 receives data in the form of an IP packet from the network processing component 305 and performs services at the Internet layer, including unpackaging the IP packet to pass transport layer data to the TCP, UDP and sockets processing component 325. In the present example, UDP is used as the transport layer protocol and so TCP, UDP and sockets processing component 325 unpackages the UDP datagram providing SIP data 250 as the output of the IP stack 320. IP processing component 315 and TCP, UDP and sockets processing component 325 may, amongst others, provide error correction and traffic management functions at the Internet and transport levels.

The SIP stack 330 provides a number of components for low level SIP processing within the application layer. In the example of FIG. 3, SIP data is first parsed by parsing component 335. Parsing component 335 may, for example, determine the type of SIP message, i.e. whether it relates to a request or whether it relates to a response. In some examples it may also identify and extract SIP field values, e.g. the "From:" address. Requests may be passed to a request handling component 345 arranged to determine the type of request and take appropriate action, such as commission a SIP transaction or dialog. Likewise, responses may be passed to a corresponding response handling component 355 arranged to determine which transaction a response relates to and take appropriate action. As described above SIP requests may initiate various functions or methods upon the SIP server. For example, a REGISTER request may initiate a registration procedure to register a user with a current device address, an OPTIONS request may query the capabilities of the SIP server and a SUBSCRIBE request may add a user or device to a list of subscribers for a particular server event or notification. Certain SIP requests, such as an INVITE request, establish an on-going exchange of messages between two devices registered to two corresponding users. This is referred to as a "dialog". For example, a VoIP telephone call, initiated by an INVITE request as shown in FIG. 1, will result in a SIP dialog between the participants. The SIP stack 330 provides a component for dialog creation 365 as well as a component for dialog continuation and termination 375. The dialog creation component 365 is responsible for establishing a new dialog following receipt of a new INVITE request and the dialog continuation and termination component 375 is responsible for managing SIP requests and/or responses relating to an established dialog. For example, in response to an ACK request the dialog continuation and termination component 375 may change the state of an existing dialog and in response to a BYE request the same component may terminate a dialog, ending a VoIP call.

Above the low-level SIP processing in the SIP stack 330, the SIP application 380 may comprise subscriber and call control logic, for example functions relating to administration of users, billing, call routing, and the setting of high-level control parameters including proxy and redirect rules and registration settings.

FIG. 4 is a schematic diagram of an exemplary SIP server 400 according to a first example. As with FIG. 3, FIG. 4 shows the functional aspects of the SIP server 400 as arranged according to the Internet model, wherein data is received from a network at the bottom of the diagram and passed from component to component to process and unpackage said data. The SIP server 400 of FIG. 4 comprises the components illustrated in FIG. 3 as well as an additional access control component 410 physically or programmatically located between network processing component 305 and IP processing component 315. The term "programmatically located" is used to specify that the access control component 410 is implemented so as to receive data from the network processing component 305 and so as to pass data to the IP processing component 315. If the access control component 410 is implemented, at least in part, by dedicated electronic circuitry then terminals of said circuitry may be wired so as to communicate with the network processing component 305 and the IP processing component 315 in this way. If the access control component 410 is implemented, at least in part, by computer program code stored in working memory and processed by one or more processors then it may be arranged to use one or more application programming interfaces (API) to initiate functions or services provided by at least one of the network processing component 305 and the IP processing component 315. The access control component 410 may also provide one or more APIs that may be called by at least one of the network processing component 305 and the IP processing component 315. The access control component 410, network processing component 305 and IP processing component 315 may also be arranged to pass data by passing handles to one or more memory locations storing such data.

In the present example, the access control component 410 is arranged to access IP packets that are unpackaged within the IP stack 320. However, in other examples the access control component 410 may be programmatically located at other levels within the IP stack 320, i.e. to operate on data managed according to a network layer below the application or SIP layer embodied by the SIP stack 330 and SIP application 380. For example, it may operate on an Ethernet frame or UDP datagram. In some examples the access control component 410 may be implemented as part of dedicated network processing hardware. In the present description, data packet will be used to primarily refer to an IP packet, but in these other examples it may also refer to other data packages, such as an Ethernet frame or UDP datagram.

In the present example the access control component 410 is programmatically located between network processing component 305 and IP processing component 315 so as to identify illegitimate packets as early as possible in the processing hierarchy presented by the SIP server. By performing a level of packet control below IP processing component 315, TCP, UDP and sockets processing component 325, and the components of the SIP stack 330 and the SIP application 380, it is possible to filter unwanted packets before they are passed to these components, thus system resources are not exhausted implementing these components to process said unwanted packets. In some examples, the access control component 410 may form part of dedicated network processor hardware, which may provide additional speed advantages as well as being at the bottom of the IP stack 320.

Programmatically locating an access control component 410 within the IP stack 320 of a SIP server 400 to perform SIP message management may be surprising to one skilled in the art. One problem with implementing packet filtering at a low level within the IP stack 320, for example at the location of the access control component 410, is that processing within the network layers of the IP stack is typically ignorant of higher level information that may be, for example, contained in the SIP data 250. IP routing and filtering is typically performed based on information in the IP header 260, whereas IP data 261 is treated as a homogenous set of data bits. The source and destination addresses within the IP header may be unrelated to the "From:" and "To:" fields identifying users at the SIP layer, for example, due to IP routing procedures, the use of IP and SIP proxies and/or user location look-up at the SIP layer. Hence, it is difficult to perform management of SIP messages from within the IP stack 320: the IP stack 320 has no concept of "SIP service", "SIP user" or "SIP legitimacy". These properties are only ascertained following processing within the SIP stack 330 and/or SIP application 380, for example a SIP message contained in SIP data 250 may only be deemed "illegitimate" following SIP authentication, which may form part of parsing component 335 or the subscriber and call control logic forming part of the SIP application 380.

To overcome this problem, the first example presents a number of filtering rules that are applied by the access control component 410 to allow data packets that are likely to relate to legitimate SIP messages to pass up the IP stack 320 to the SIP stack 330. These filtering rules may be based on information that can be rapidly ascertained from transport layer data and SIP data encapsulated with the IP data 261 within an IP packet.

Some exemplary filtering rules will now be described. These rules may be applied in any combination of one or more rules. They may also be combined with additional rules not specified herein, for example those discussed with regard to the second example, based on the specific implementation.

A first rule may be based on the transport layer protocol used. The transport layer protocol used to encapsulate data with IP data 261 may be indicated in the "Protocol" field in IPv4 or the "Next Header" field in IPv6. The filtering rules may require UDP datagrams. This is because most SIP messages are transmitted using UDP. Additionally a high proportion of DoS or DDoS attacks use TCP. Hence, the access control component 410 may inspect the IP header for a value of "0x11" (17 in decimal) indicating UDP.

A second rule may be based on the properties of the received data packet. For example, the access control component 410 may be configured to only pass unfragmented packets to upper stack layers. SIP messages typically fit within a single frame of data within the network layer. Hence, SIP messages are unlikely to use fragmented data packets at the Internet or IP layer. Fragmentation may be indicated in IP header 260, for example in flag and/or fragmentation offset fields in IPv4 and specific extension fields in IPv6.

A third rule may be based on transport layer information. If the first rule is applied this may comprise information such as the UDP port number. This may be retrieved following an inspection of the IP data 261. As the UDP header comprises fields of a fixed length, the position of the destination port number will be constant for each IP packet. Hence, the access control component 410 may inspect bits at particular offsets within the IP data 261 to retrieve the UDP port number. For example, bits 16 to 31 of the IP data 261 may comprise the destination port number. In one example, the second rule may allow through packets with a particular extracted UDP destination port number. For example, SIP messages are communicated using UDP port 5060. The access control component 410 may thus require a UDP destination port number equal to 5060, or any other port number assigned to SIP communications.

A fourth rule may be based on SIP data following transport layer information, for example one or more characters following the UDP header. As UDP fields are short and are of a fixed size, the start of the UDP data 256 can be ascertained. To reduce system overheads, i.e. the use of system resources, a full parse of the SIP data is not performed. One or more characters following the UDP header may be extracted without significant overheads or a full parse of the IP data 261; for example, bits 64 onwards may comprise text characters representing the beginning of a SIP message contained in SIP data 250. In one example, the access control component 410 allows data packets relating to SIP REGISTER requests to pass to the upper stack layers. These requests may be from unknown network devices as explained in more detail with reference to FIG. 4B and FIG. 6. To identify a REGISTER request text characters extracted from the IP data 261 may be compared to characters in the text "REGISTER", for example four characters may be extracted XXXX and the access control component 410 determines if they match the characters "REGI". In this description, the phrase "likely to be a REGISTER request" is to be interpreted as requiring at least a partial match or a probabilistic match with a likelihood exceeding a given threshold.

All four rules are typically applied in the order set out above by the access control component 410. In some examples, a subsequent rule may only be applied if a data packet complies with or conforms to a previous rule. If a data packet does not conform to a previous rule it may be discarded. The first and second rules in this case may be applied in reverse order so long as rules three and four follow the first two rules. This cascade or hierarchy of rules provides an efficient implementation, wherein not all rules need to be applied to discard a data packet; for example, if a data packet fails the second rule it may be discarded without applying the third and fourth rules. By applying all four rules, the access control component 410 passes unfragmented UDP-based data packets addressed to a UDP port associated with a SIP application and comprising data likely to be a REGISTER request. As discussed the rules may be readily applied to inbound data packets without large processing overheads; typically only an inspection of IP header information and/or small portions of data located at set bit offsets is required. In other examples, a combination of one or more of the four rules may be applied, depending on implementation requirements. For example, certain implementations may need to support receiving fragmented messages from unknown devices, in which case the second rule would not be applied, and instead, fragments would be reassembled before applying any rules that inspect the transport layer and SIP data. The access control component 410 may be arranged to drop or discard a data packet that does not match one or more of the four rules. The term "discard" will be used herein as synonymous with "drop" and meaning to delete or otherwise dispose of the data that constitutes a packet. In implementations, a data packet may be discarded by deleting data corresponding to said packet from memory, the memory being associated with computer hardware implementing the IP stack 320 or buffer memory associated with network hardware.

Figure 4A:
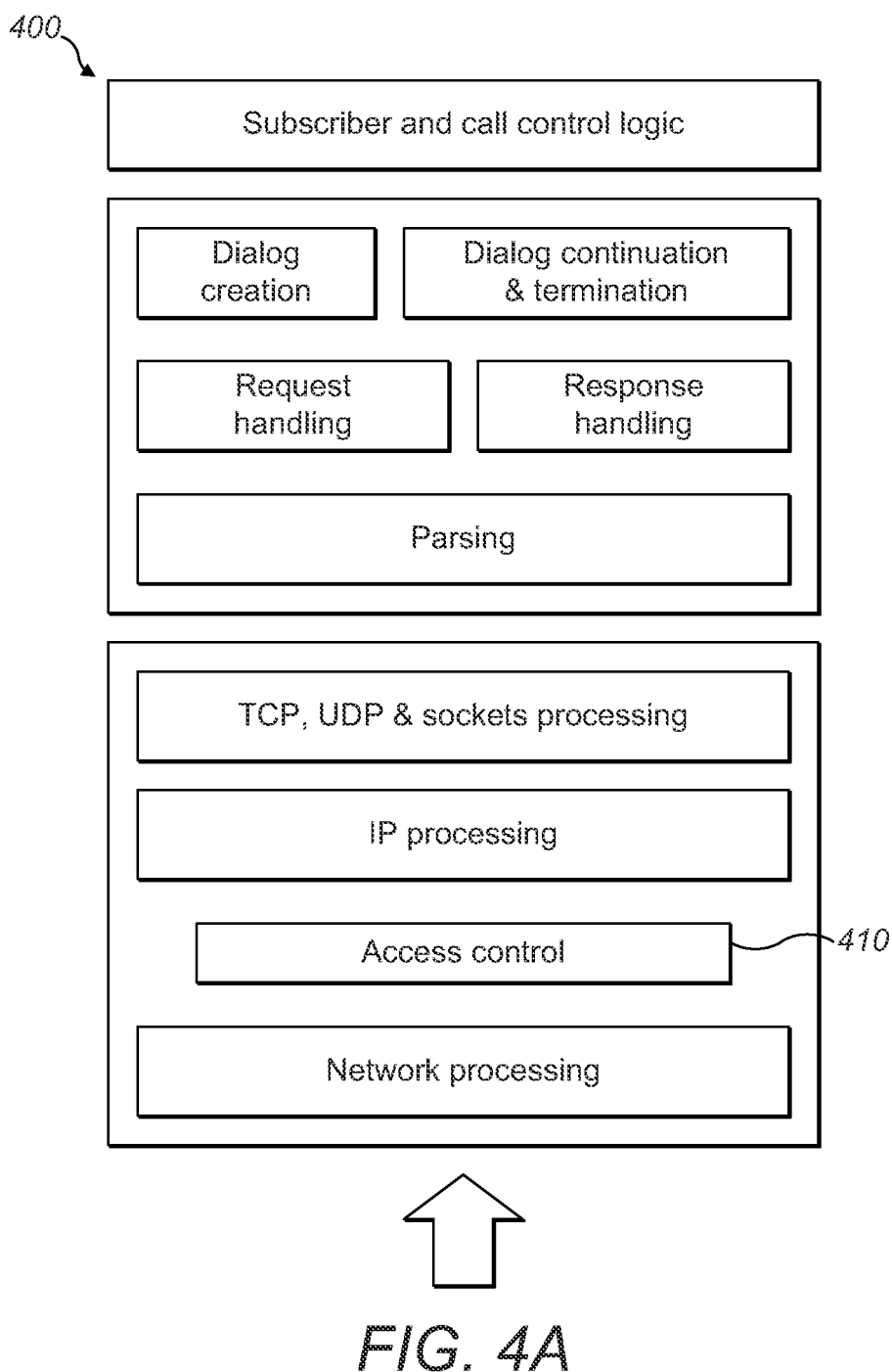
FIG. 4A is a schematic diagram of an SIP server arranged according to a first example.
Figure 4B:
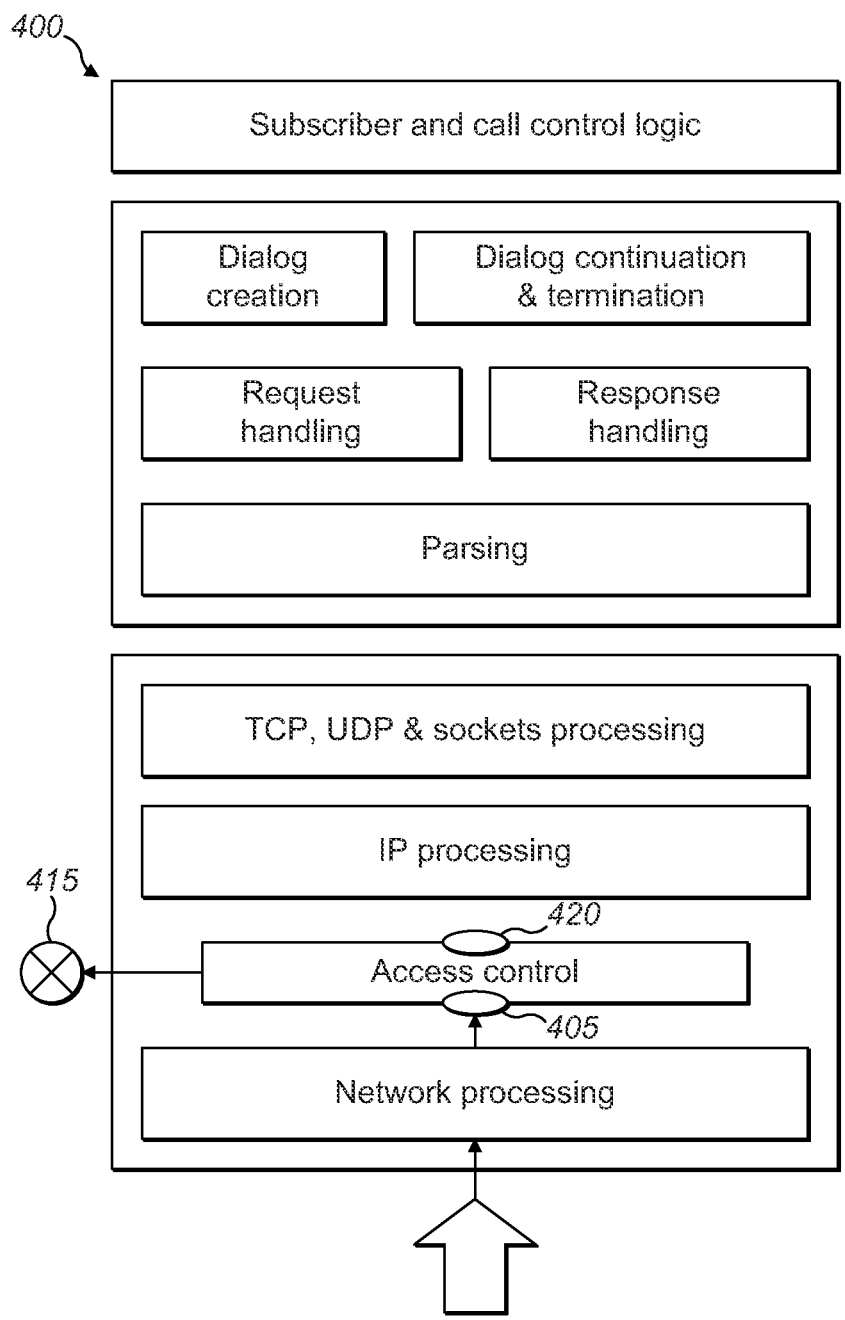
FIGS. 4B and 4C are schematic diagrams illustrating data flow through the SIP server of FIG. 4A.
Figure 4C:
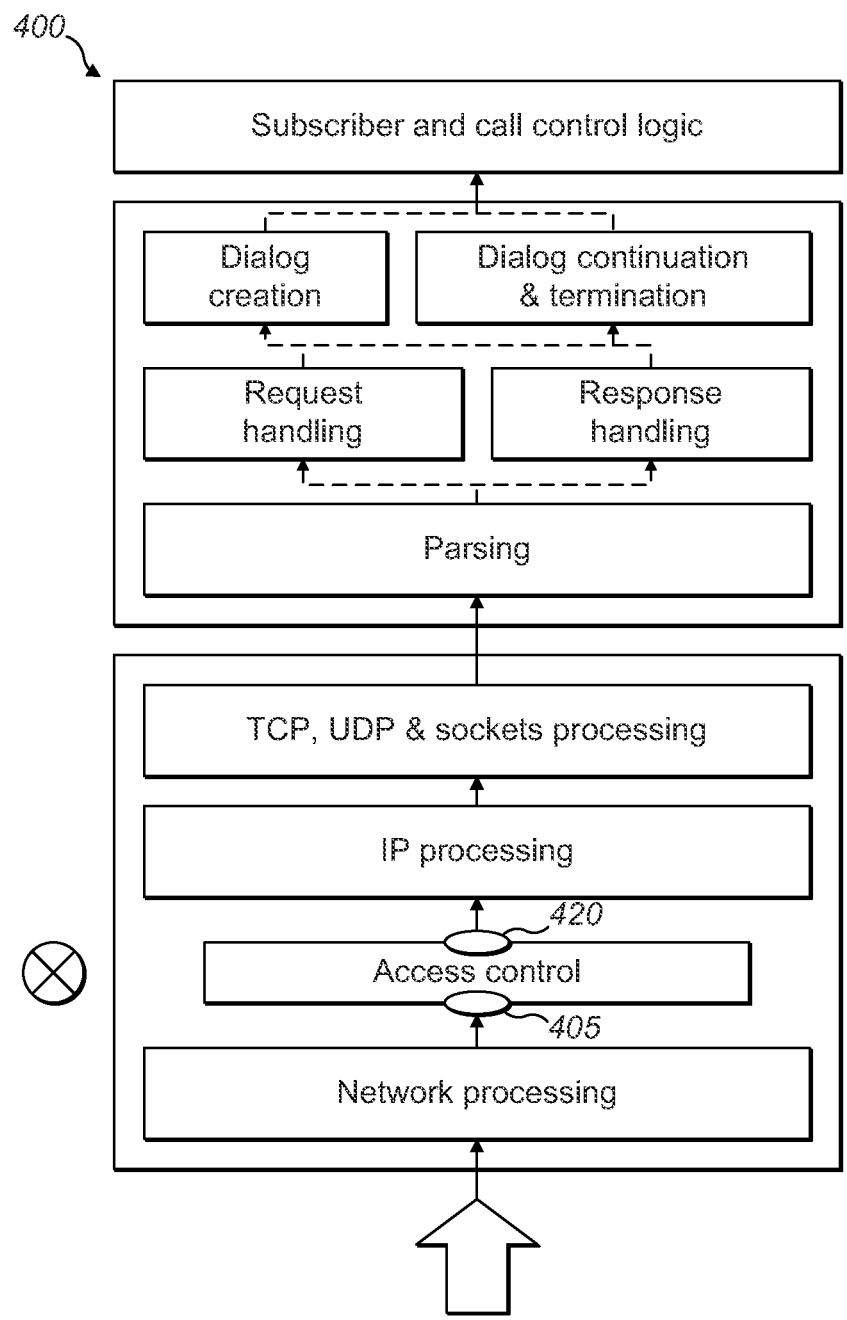
Figure 5A:
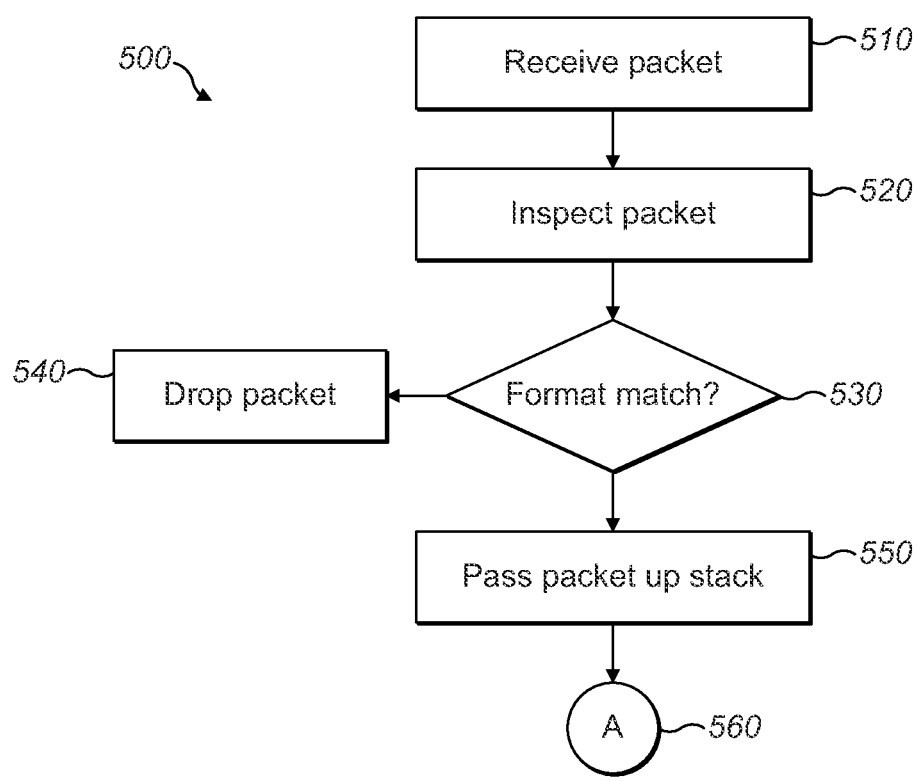
FIG. 5A is a flow chart showing a packet filtering method according to the first example.
Figure 5B:
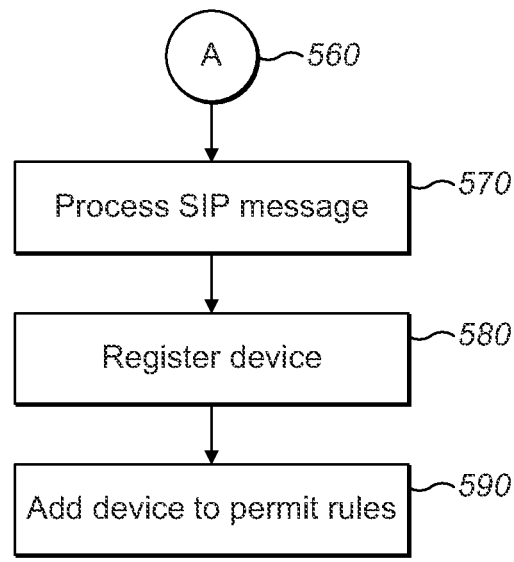
FIG. 5B is a flow chart showing an additional number of steps according to a first variation of the method of the first example.
Figure 6:
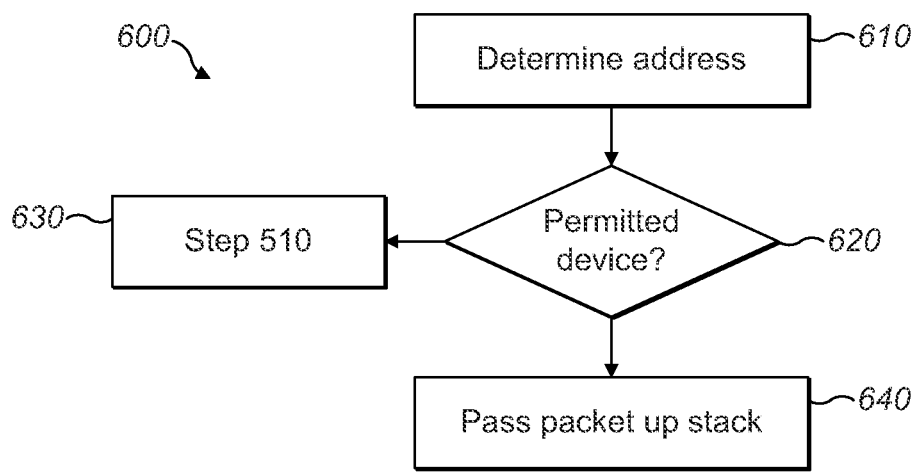
FIG. 6 is a flow chart showing a device filtering method according to a second variation of the method of the first example.

The filtering rules may be applied as part of a two-stage filtering process. The two-stage filtering process is typically used when all four rules described above are applied. However, it need not be applied if, for example, one or more of the first three rules are applied. The two-stage filtering process is illustrated in FIGS. 4B and 4C, wherein the methods of FIG. 6 and FIGS. 5A and 5B are applied. FIGS. 4B and 4C represent the two filtering stages as first stage filter 405 and second stage filter 420. Element 415 represents the discarding of a packet, for example passing data to a memory garbage collection routine. In the second stage of the filtering process, the access control component 410 applies one or more of the filtering rules described above. In a first stage of the filtering process, the access control component 410 determines whether a data packet relates to a network device that is recognised by the SIP server 400. If the data packet relates to a network device that is recognised by the SIP server 400, it is passed to IP processing component 315 while bypassing the second stage. If the data packet relates to a network device that is not recognised by the SIP server 400, i.e. is an unknown device, the second stage of filtering is performed.

In FIG. 4B data at the network layer is received as indicated by arrow 310. This may comprise receipt of an Ethernet frame. The frame is processed by the network processing component 305, which passes an IP packet to the first stage filter 405 of the access control component 410. The first stage filter 405 applies the method 600 of FIG. 6. At step 610, a network address associated with the IP packet is identified, which is typically the network address of a network device such as the source IP address from the IP header 260. At step 620, a check is made to see whether the identified network address matches an entry in a list of permitted network addresses, i.e. is received from a permitted network device. If the network address of the network device does not match an entry in a list of permitted network addresses, the network device is deemed "unknown" and the data packet is passed to the second stage filter 420 at step 630. The second stage filter 420 applies the method of FIG. 5A, starting from step 510. If the network address of the network device matches an entry in a list of permitted network addresses, i.e. the network device is "known", the access control component 410 bypasses the second stage filter 420 and passes the data packet to the IP processing component 315. Processing up the IP stack 320 and the SIP stack 330 then proceeds at step 640, as for example illustrated by the exemplary data paths of FIG. 4C. This enables SIP communications with a "known" device. In some examples, step 620 may also comprise a step of determining whether the network address matches an entry in a list of banned network addresses. If the network address does match an entry in a list of banned network addresses, the originating network device is deemed to be a "known, banned" device and the data packet is discarded.

Turning to FIG. 5A, the second stage filter 420 applies one or more of the filtering rules as discussed above. At step 510, the data packet is received from the first stage filter 405. At step 520, the packet is inspected. This may comprise extracting information for matching according to one or more of the four filtering rules as described above. At step 530, one or more of the filtering rules are applied to determine whether the received data packet matches a defined data format. This format may comprise an unfragmented UDP-based data packet addressed to a UDP port associated with a SIP application and comprising data likely to be a REGISTER request. If the data packet does not match the defined format, i.e. fails one or more of the filtering rules, it is discarded at step 540. These discarded packets are likely to comprise malicious communications sent as part of a DoS or DDoS attack. The process of discarding a data packet is shown in FIG. 4B. If the data packet matches the defined data format, i.e. passes the applied filtering rules, it is passed to the IP processing component 315 for continued processing up the IP and SIP stacks. This is shown in FIG. 4C. The data paths of FIG. 4C are for example only and may not represent all data paths that data can take through the two stacks.

Figure 4D:
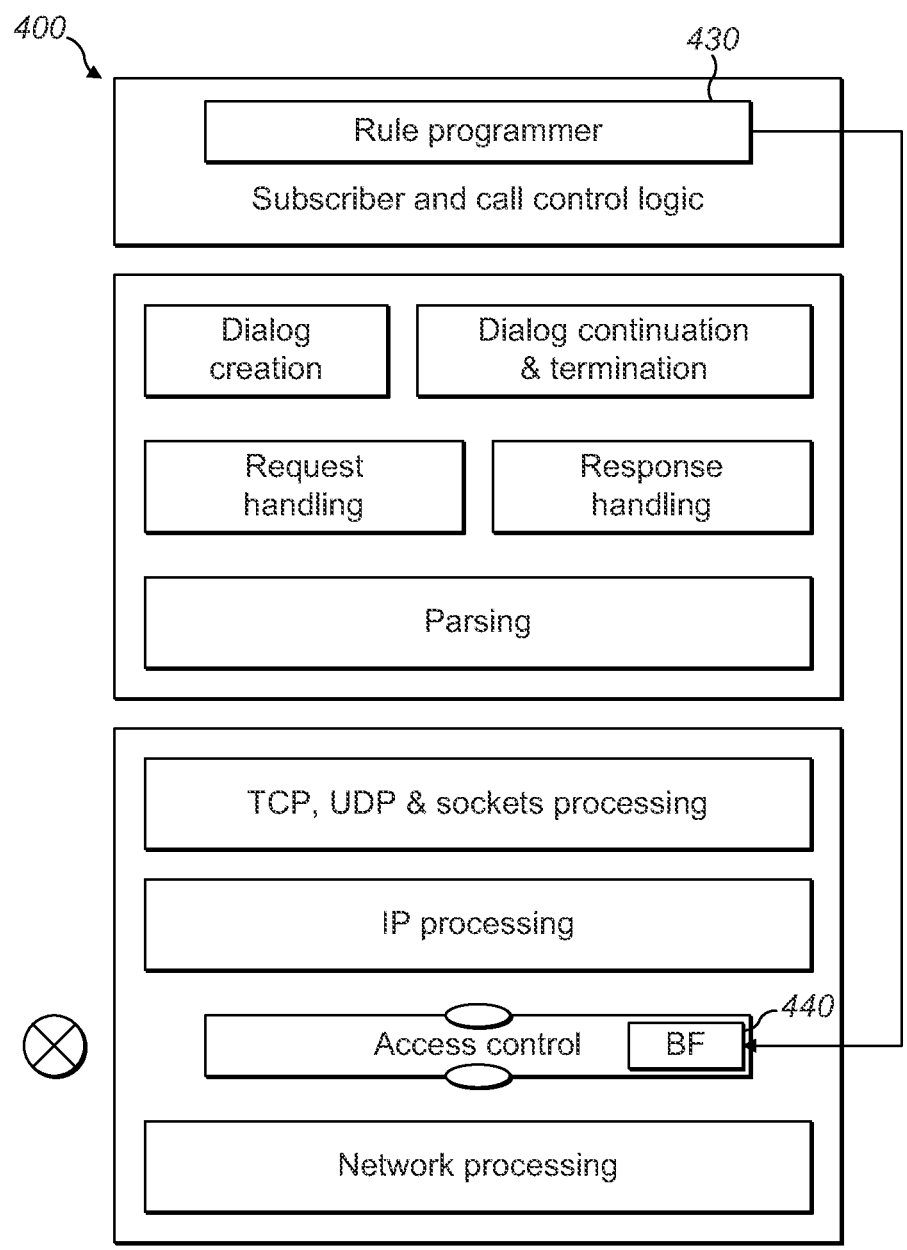
FIG. 4D is a schematic diagram of a modified SIP server according to a variation of the first example.

A variation of the first example will now be described in association with FIGS. 4D and 5B. FIG. 4D shows the SIP server 400 with a number of additional elements. In the present variation, access control component 410 uses a Bloom filter 440 to implement at least the first stage filter 405. The present variation further comprises a rule programmer 430 that is provided as part of the SIP application 380.

A Bloom filter is a known probabilistic data structure. Initially, it may comprise an array of m bits set to 0. A set of k functions, such as hash functions, map an element to k of the m array positions. The values of m and k are selected based on the required false positive rate and resource limitations such as memory size. To add an element to the Bloom filter, such as a permitted IP address, the element is input into each of the k functions to yield k array positions. These positions are then set to a bit value of 1. To query a Bloom filter, for example to determine whether an IP address of a network device has been added to the filter, the query element is also input into each of the k functions to yield k array positions. If any of the bits in these k array positions are 0, the query element has not been added to the filter, e.g. the device is not a permitted device. With a Bloom filter false positives are possible but false negatives are not, e.g. a network address that has not been added to the filter may still not return any 0 bits in response to a query, falsely indicating a permitted device, because of other existing elements added to the filter which have happened to set the array locations indicated by the query to 1. However, a network address that has been added to the filter will never return any 0 bits when reapplied in a query (i.e. provide a false negative result), meaning that permitted devices that are added to the filter will never by denied access.

A Bloom filter is particularly advantageous for permitted device filtering as it can compactly store a large number of filter entries; for example, in a typical network there may be millions of permitted devices with respective permitted network address—these may be stored efficiently using a Bloom filter. A Bloom filter may also be loaded into fast memory; for example, cache, (fast) random access memory (RAM), or dedicated device memory with rapid access times and applied without consuming a large quantity of system resources. This is important as it may need to be accessed for each received packet in high packet throughput implementations. These properties are useful for an implementation within a SIP server. As the SIP server needs to perform SIP processing it has limited resources for access control; a Bloom filter can operate successfully with these limited resources. This is especially important during overload conditions wherein, as explained above and below, a SIP server to process a large number of inbound data packets.

A Bloom filter may also be used to implement a list of banned devices. Network addresses that frequently generate false positive results, e.g. which are allowed through the first stage filter 405 yet subsequently fail SIP authentication a set number of times, may be banned or removed from the Bloom filter implementing the list of permitted addresses.

Turning to FIG. 5B, a feedback process for adding a permitted network address is provided according to the present variation. The variation may be implemented when applying the fourth filtering rule as described above. The method of FIG. 5B may be applied following the method of FIG. 5A, starting at point A 560. At step 570, the components of the SIP stack 330 perform SIP processing on data, such as SIP data 250, received from the IP stack 320. This may comprise parsing the SIP data 250 using parsing component 335. When applying the fourth filtering rule, the SIP data 250 is likely to comprise a REGISTER request and, if it does, it is passed to request handling component 345 to initiate a registration SIP transaction. At step 580 the SIP server 400 registers a device to a user, for example user "bob" to a network device with an IP address of "199.40.60.195" as set out in the above example. In some examples the registration request may be passed to a further SIP server to perform registration instead of performing the registration locally (so-called "location services"). Following registration or a response from a further SIP server confirming registration, the network address of the registered device is added to the list of permitted network addresses at step 590. As illustrated in FIG. 4D, step 590 may be performed by rule programmer 430 that forms part of SIP application 380. In this example, rule programmer 430 initiates a function to add the network address of the registered network device to the Bloom filter 440. If a Bloom filter is not used, rule programmer 430 may be arranged to perform an appropriate equivalent function, for example to add an IP address of the registered device to a text list used by access control component 410. By adding a device that successfully registers to a list of permitted devices implemented by the access control component 410, the SIP server 400 ensures that legitimate users, e.g. those that pass authentication as part of a REGISTER request, can make calls using SIP and perform other SIP transactions. As discussed above, once a device is added to a list of permitted devices, data packets from that device may be passed to the SIP stack 330 bypassing the second stage filter 420. If a permitted device exhibits suspect SIP usage its network address can be flagged. It can then be removed from the list of permitted devices or added to a banned list, which may apply temporarily. These functions may be performed by an administrator of SIP application 380 or automatically. For example, in the latter case an acknowledgement of successful registration may trigger an API function call on the access control component 410 with the registered device address being passed as function data.

The first example may be used with SIP servers that are at risk of exposure to high volumes of SIP traffic from malicious sources. It is particularly useful for gateway devices such as Session Border Controllers (SBCs) that are particularly at risk of DoS or DDoS attacks. The first example efficiently discards malicious IP traffic with a minimal expenditure of computing resources. This allows a high level of service to be provided to legitimate users. The use of filtering rules and/or the two stage filtering procedure provides a practical solution that is stable and effective at high message volumes.

A second example will now be described. The second example may be implemented independently of, or in addition to, the first example. The method and system of the first example may alternatively comprise a variation of components of the second example, as will be described in more detail below. The first example may be considered a solution that determines which incoming data packets are deemed to be legitimate. The second example may be considered a solution that determines how to handle a large volume of traffic that has been deemed legitimate. As such, the second example is particularly suited to managing both high legitimate traffic levels and malicious attacks.

Standard implementations of SIP servers do not cope well in an overload situation. Following high traffic volumes, a SIP server may become congested, e.g. internal queues may fill up and processing within a SIP application may fail to keep up with the inbound packet rate. Due to this congestion, an IP stack may begin to drop packets arbitrarily. Dropped packets can cause an originating network device to retransmit the original packets, which in turn increases the per-call traffic received by the SIP server. This results in a positive feedback loop that further overloads the SIP server and encourages protocol timeouts. Protocol timeouts then result in failed SIP communications, such as failed calls while dialing or dropped call communications. These can be frustrating for a user of the communications system.

In addition, in prior art implementations, an IP stack and lower layers of a typical SIP stack treat all incoming items of work as equal. Items of work may comprise a SIP transaction or SIP dialog. Messages that form part of a DoS attack are allocated the same computing resources as legitimate messages until SIP authentication is performed. It is straightforward for an attacker to overwhelm the lower layers of both stacks so that the SIP server spends the majority of its resources processing and then discarding malicious traffic.

Both of these scenarios lead to a "bottom heavy" allocation of resources, i.e. an allocation of system resources such as memory and Central Processing Unit (CPU) cycles to processing being carried out at low-levels of the Internet model. In this case, a SIP server may be so busy trying to keep up with low level packet reception and parsing that it cannot complete items of work belonging to legitimate users. Furthermore, every time the SIP server initiates a legitimate item of work, it is at risk of aborting this item due to protocol timeouts.

The second example provides a more intelligent method and system of work prioritization. An existing SIP server comprising a standard operating system IP stack and a widely-available SIP stack can be modified to implement the second example with a minimum amount of disruption and alteration. The second example acts to finish started items of work, for example SIP telephone calls, rather than abort said calls partway through. It does this by determining whether an item of work can be finished; if it cannot it is not started. The second example further avoids bottom-heavy resource allocation by limiting the number of messages that can be passed up the IP stack. It acts to discard messages leading to processing tasks as early as possible, thus minimising computational cost. It may also prioritise inbound packets and drop them intelligently based on their priority rather than indiscriminately.

Figure 7A:
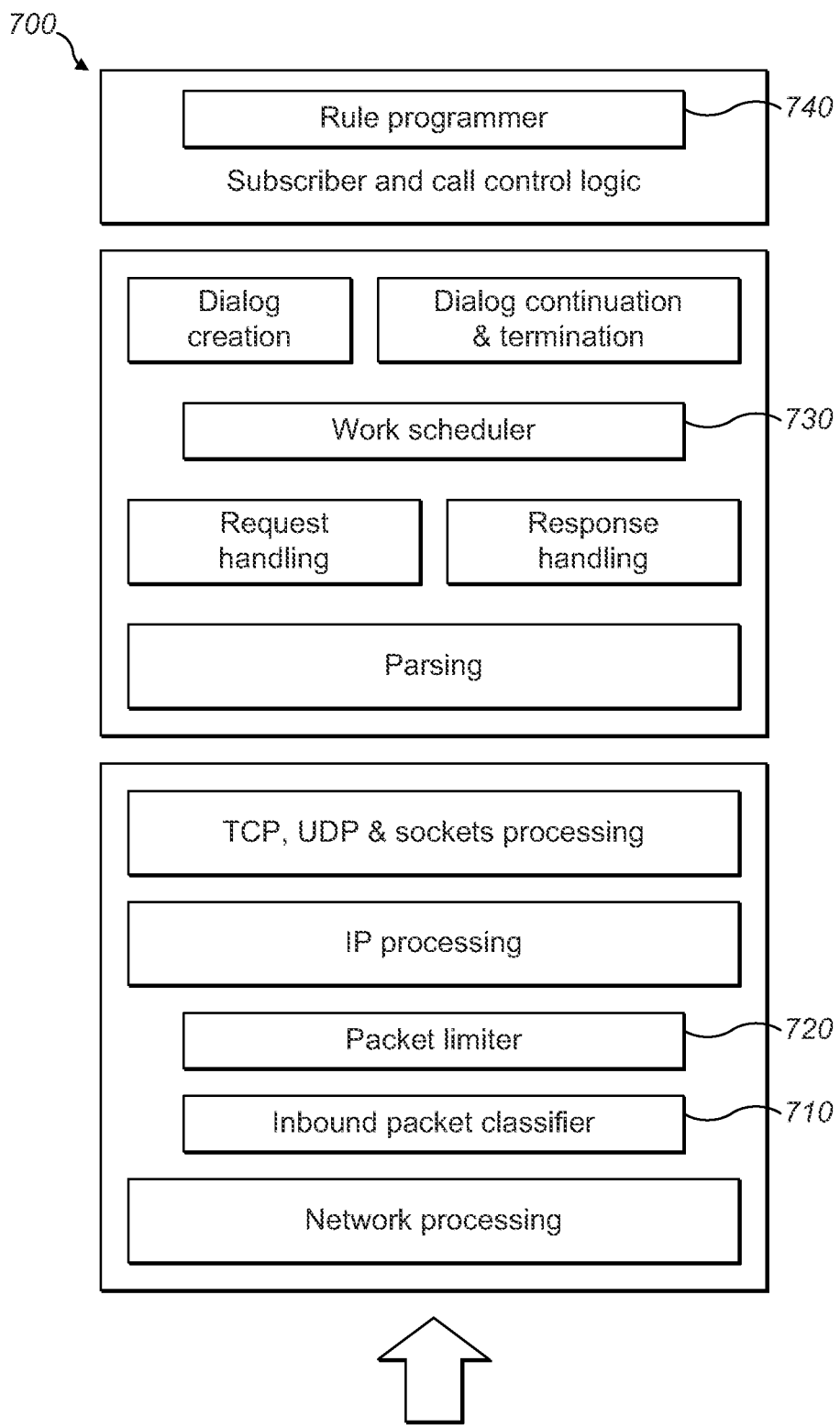
FIG. 7A is a schematic diagram showing a SIP server arranged according to a second example.

Exemplary components of a SIP server implementing the second example are shown in FIG. 7A. The SIP server 700 comprises the exemplary IP stack 320, SIP stack 330 and SIP application 380 as shown in FIG. 3. In addition to the components of FIG. 3, four further components are provided: an inbound packet scheduler 710, a packet limiter 720, a work scheduler 730 and a rule programmer 740. While four components are shown, fewer components may be provided in certain implementations; for example, in some implementations only packet limiter 720 and work scheduler 730 need be provided. The inbound packet classifier 710 is programmatically located between the network processing component 305 and the packet limiter 720, such that it is arranged to receive IP packets from the network processing component 305 and pass processed versions of these packets to the packet limiter 720. The packet limiter 720 is programmatically located between the inbound packet classifier 710 and the IP processing component 720. It is thus arranged to receive packets from the inbound packet classifier 710. In some implementations that omit inbound packet classifier 710, the packet limiter 720 may be arranged to receive packets directly from the network processing component 305. The packet limiter 720 is arranged to selectively forward packets to the IP processing component 315. This may comprise only passing a subset of packets received from either the inbound packet classifier 710 or the network processing component 305 to the IP processing component 315. The subset of packets that are passed to the IP processing component 315 may be based on a set of configurable rules. In this regard, in some examples, the inbound packet classifier 710 and/or the packet limiter 720 may implement functions of the access control component 410 of the first example. A set of configurable rules that may be applied by the packet limiter 720 are described in more detail below.

SIP server 700 in FIG. 7A also comprises two further components respectively located within the SIP stack 330 and the SIP application 380. The first is a work scheduler 730. The work scheduler 730 is arranged to receive details of new SIP transactions or SIP dialogs following initial parsing of a SIP message by the parsing component 335 and any required request handling by request handling component 345. In some examples, the work scheduler 730 may be implemented as part of the dialog creation component 365. The second component comprises rule programmer 740, which forms part of the SIP application 380. The rule programmer 740 interacts with the inbound packet classifier; as such implementations that omit the inbound packet classifier 710 may also omit the rule programmer 740. In some examples, rule programmer 740 may have functions similar to rule programmer 730 in FIG. 4D. Functions of the rule programmer 740 are described in more detail below.

Components 710, 720, 730 and 740 are well-encapsulated, meaning they can be implemented or inserted in a modular fashion without disrupting an existing SIP server implementation. The functions of each component will now be described in more detail.

The inbound packet classifier 710 is arranged to inspect incoming data packets and assign an appropriate priority. The priority may be based on a classification according to set of rules populated by the rule programmer 740. The rules may be based on properties of inbound packets at the network, Internet, transport and/or SIP level. For example, the rules may comprise, amongst others, one or more of: "does the data packet use UDP or TCP?"; "is the data packet from a known network device?"; "is the data packet destined for a transport-layer port associated with a SIP application?"; "is the network device or network flagged as suspicious?"; and "is the network device a banned network device?". As an example, priorities may be assigned in response to the application of these rules as follows: assign a high priority to known network devices; assign a medium priority to an attempt by a new subscriber to access SIP services, this may be in the form of suspected REGISTER request from an unknown network device (e.g. to a data packet that matches the four rules of the first example); assign a low priority to network devices or networks that have been downgraded or that have exhibited previous suspect behaviour; and drop packets that have been explicitly blacklisted. Hence, in some examples, the inbound packet classifier 710 may be considered an extension of the access control component 410 of the first example, wherein, rather than pass packets that match a set of rules, the access control component assigns a priority based on one or more of the rules and then this priority is used to pass or discard the packet. This enables a more refined packet dropping strategy to be implemented.

In some examples the inbound packet classifier 710 may be implemented in dedicated network processor hardware, such hardware having access to memory in which the rules are defined. For example, the inbound packet classifier 710 may extend the functionality of the access control component 410 of the first example and assign one or more priorities to source IP addresses in the IP header that match registered subscriber devices. Multiple lists may be provided wherein each list stipulates a different priority level. The inclusion on one of said lists may be based on user or subscriber properties; for example, a network address of a network device registered to a premium subscriber may be placed in a high priority queue whereas a network address of a network device registered to a non-paying subscriber may be placed in a low priority queue. A priority may be assigned by first classifying a packet according to the rules and then tagging said packet with the result of the classification. A priority tag may be included in the Differentiated Services Code Point field in an IP header and/or custom "user data" as defined for various SIP messages.

The packet limiter 720 is arranged to limit the inbound packet rate to a level that higher level services can cope with. To do this it discards packets according to particular rules. As packets are restricted by the packet limiter 720, components within the IP stack 320 need not drop packets indiscriminately. If an inbound packet classifier 710 is used, for a given packet throughput rate, the packet limiter 720 may discard a packet with a low priority in preference to a packet with a high priority, the priorities being determined by priority tags as described above. Taking a simplified example, if only two packets are allowed to proceed through the packet limiter 720 per second and four packets are received in one second, then the two packets with the highest and second highest priorities in the group may be passed to the IP processing component 315 and the other two packets may be discarded. If an inbound packet classifier 710 is not used, or if two packets have a common priority level, the packet limiter 720 may be arranged to limit packets based on their source and a particular throughput level. In this case, the packet limiter 720 implements what will be referred to as a sacrificial algorithm. This algorithm sacrifices communications from a first set of sources to maintain an adequate or good level of service for a second set of sources. This is as opposed to, for example, maintaining a poor level of service for all sources. One implementation of the sacrificial algorithm is described below, although other implementations that achieve the same effect may also be used.

To apply the sacrificial algorithm a traffic throughput level is set. This throughput level may be set by an administrator using, for example, rule programmer 740 or may be set automatically based on resource utilisation metrics, for example a throughput level that enables upper stack processing without overload may be selected based on a defined calculation or algorithm. The traffic throughput level may vary depending on the priority level, for example a higher priority level may have a higher traffic throughput level. The traffic throughput level may be set as an absolute value, for example X packets per time period, or a percentage of total incoming traffic, for example M % of all incoming packets received per time period. For ease of explanation, a traffic throughput level expressed as a percentage will be assumed for this example. The present sacrificial algorithm comprises a function that randomly maps a network address to a value between 1 and 100. The network address may be the source IP address and/or UDP or TCP port. The function may be a suitably selected hash function. In use, the network address of the inbound data packet is input to the function to produce an output value: N. If N is greater than M, the percentage of incoming traffic, (i.e. N>M) the algorithm instructs the packet limiter 720 to drop the packet. If N is less than or equal M (i.e. N<=M) the algorithm instructs the packet limiter 720 to pass the packet to the IP processing component 315. The exact nature of the equality evaluations may change depending on the implementation. To ensure that the same set of devices are not continually "sacrificed" by the algorithm, the function may be modified or transformed following a time interval; for example, a hash algorithm may be transformed every 5 minutes such that the first and second set of sources change. If a function outputs n when applied in one time period, it may output i after the function is transformed, i.e. in a subsequent time period. The algorithm may only be applied when the server is congested, e.g. one or more resource usage metrics exceed given threshold values, or may be applied continually. The algorithm has the effect that, while the system is under a steady level of congestion, the same sources will consistently have their packets either dropped or processed.

The work scheduler 730 is arranged to determine when and/or whether to initiate a new item of work based on a level of system activity. As discussed previously, an item of work may comprise the processing of a SIP transaction or the creation of a SIP dialog. The level of system activity may comprise, amongst others, a current level of system activity, an average over a given time period, a historical metric of past behaviour and/or a compound metric generated from various system resource measurements. The "system" may comprise the hardware implementing the SIP server, for example one or more CPUs and working and/or buffer memory and/or one or more individual components of the SIP server. In the latter case, "activity" may comprise a data throughput level of any one of the components in the IP or SIP stack, a level of messaging activity within the system, such as a number of queued messages in the system (typically not including any queue managed by the work scheduler) or a measure such as concurrent call numbers provided by the SIP application.

In one example, the work scheduler divides items of work into two groups. Items in a first group are initiated or scheduled as soon as they are received. Items in a second group are added to a queue of pending items. This queue may be, in certain implementations, a First-In-First-Out (FIFO) data structure, wherein items are taken from the queue based on the order in which they are added. The work scheduler 730 takes a measure of system activity, for example a number of SIP messages received in a given time period or a number of control messages passed between components of the SIP server in a given time period, and takes an item of work from the second group off the queue to be initiated or scheduled if the measure of system activity is below (and/or equal to) a given threshold. Once said item is complete, and if the measure of system activity remains below (and/or equal to) the given threshold, another item may be taken from the queue. If the measure of system activity is above (and/or equal to) a given threshold, the items in the second group remain pending in the queue.

When taking items of work from the queue the work scheduler 730 may be arranged to take into account the priority assigned by the inbound packet classifier 710. For example, the work scheduler may be arranged to scan the queue for high priority items and process these in preference to lower priority items. Alternatively, separate queues may be implemented for each priority level and each queue may be considered in order of priority, e.g. items of work may be taken from a high priority queue before taking items of work from a medium priority queue.

The work scheduler 730 may further be arranged to review items of work in the queue at predetermined time intervals. It may then be arranged to discard items of work and/or send a busy response if an item of work has remained in the queue for a predetermined number of time intervals. As an example, it may be decided to discard items of work that remain in the queue for three time intervals, wherein each time interval is one minute. Hence, if items of work remain in the queue for three minutes or longer, at the next check by the work scheduler 740, the item of work may be removed from the queue and a busy response sent to the originating network device. The originating network device is then able resend their original request, possibly to an alternate server. References to "given time periods", "time intervals" and "predetermined" values may cover any such values, whether they be set by an operator of the SIP server via the SIP application 380 or set automatically based on one or more operating algorithms.

The items of work assigned to the first group may comprise SIP processing of inbound responses or in-dialog messages, i.e. SIP messages relating to an ongoing dialog or call. These may be referred to as "work continuing" items as they continue with existing tasks. The items of work assigned to the second group may comprise new SIP calls (e.g. new INVITE requests) or new out-of-dialog messages, i.e. messages that do not relate to an ongoing dialog or call. These may be referred to as "work creating" items as they do not relate to existing tasks and instead require new tasks to be set up. This implementation thus provides a solution that may be easily implemented and/or retrofitted to existing systems.

As another example, for a given level of system activity the work scheduler 730 may be arranged to initiate a given number of work items in a set time period (e.g. 2 in 10 seconds). If the work scheduler 730 receives indication of a number of pending requests from the request handling component 345 (e.g. 4), then it may determine to initiate the pending requests that have associated packets with the highest assigned priorities. The work scheduler 730 may be arranged to parse custom user data in the SIP message, or receive parsed priority data from another component, to determine a priority tag relating to a pending request. Alternatively or additionally, the work scheduler 730 may be informed of, or may measure, a specific system capacity, for example 1000 free CPU cycles and 50 MB free RAM for the next 10 minutes. It may then schedule a new item of work based on a pending request that does not exceed this capacity; for example, a new call (INVITE request) may require a new dialog and be estimated to utilise 1500 CPU cycles and 100 MB of RAM over a 30 minute period for the complete processing of the dialog, whereas two registrations may each require 250 CPU cycles and 25 MB of RAM and may each be completed in 2 minutes. The work scheduler 730 would then schedule the two registration transactions and either queue the new call request or send a busy response. If the item of work is queued then the work scheduler 730 may recheck system capacity after a time period has expired; for example, 5 minutes later the two registration requests would be complete and an additional 1000 CPU cycles and 50 MB RAM may have become free, a dialog for the new call could then be initiated. In any implementation a trade-off is typically made between the ease of implementation and the required level of scheduling complexity. In some implementations, a solution that uses a less complex measure of system activity, such as pending messages, and a less complex processing strategy, such as the two-group queue system described above, may be better suited to high-throughput systems.

A SIP dialog is particularly suited to being defined as an item of work as it consists of several requests. If SIP requests are taken as items of work instead of the SIP dialog then this may result in a poor call experience for a user, for example there may be enough resources to process an additional INVITE request but not enough resources to maintain the call. In this case the user would be able to place the call, but would lose the call during its duration. When the work scheduler 730 confirms that there are enough system resources to handle the complete dialog before initiating dialog creation this does not occur, with the trade-off being that users may receive a higher number of busy responses during periods of congestion.

The rule programmer 740 is arranged to provide the rules used by the inbound packet classifier 710. In alternative examples, the rule programmer 740 may be responsible for training the inbound packet classifier 710 or loading configuration data following training if rules are not used.

Figure 7B:
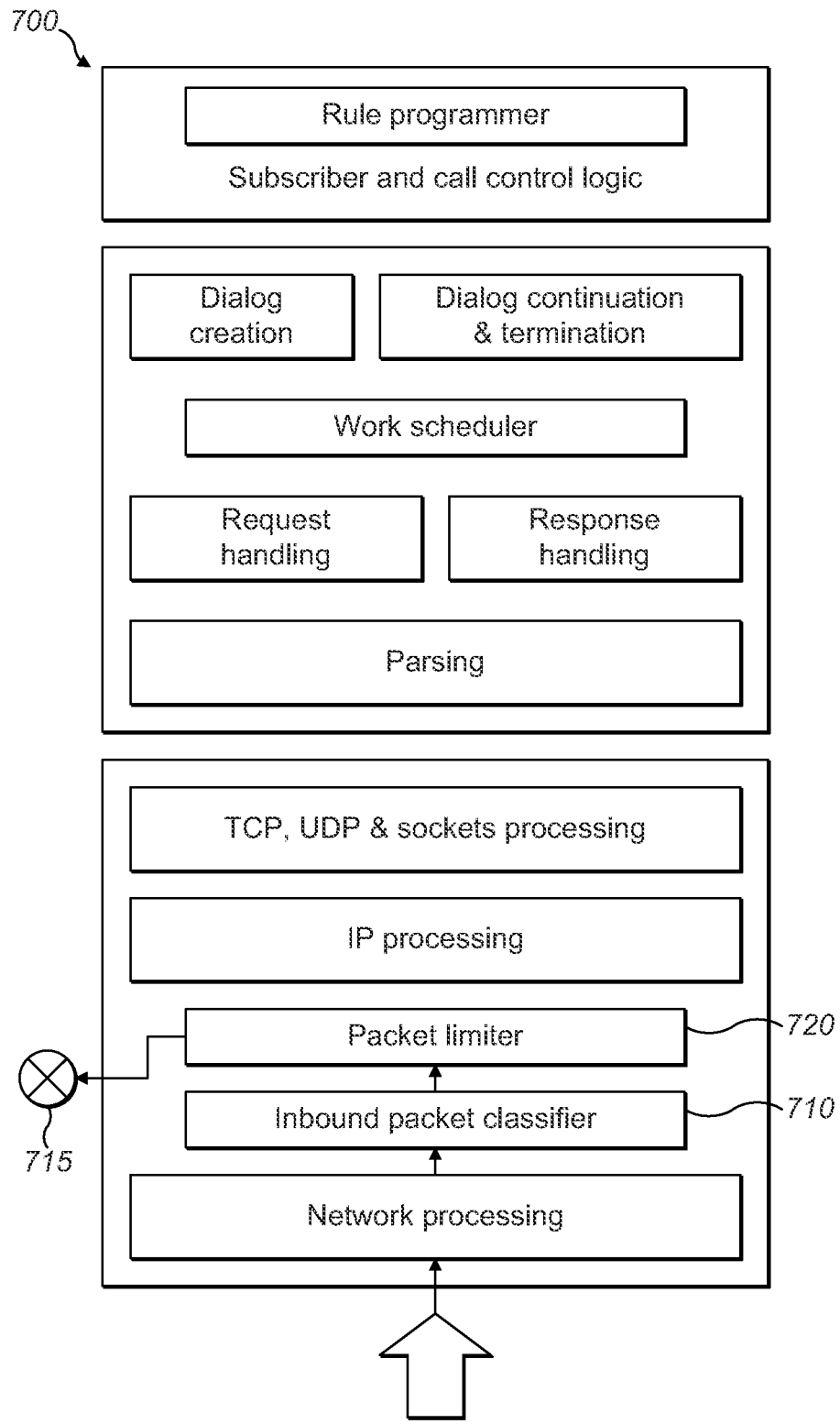
FIGS. 7B and 7C are schematic diagrams illustrating data flow through the SIP server of FIG. 7A.
Figure 7C:
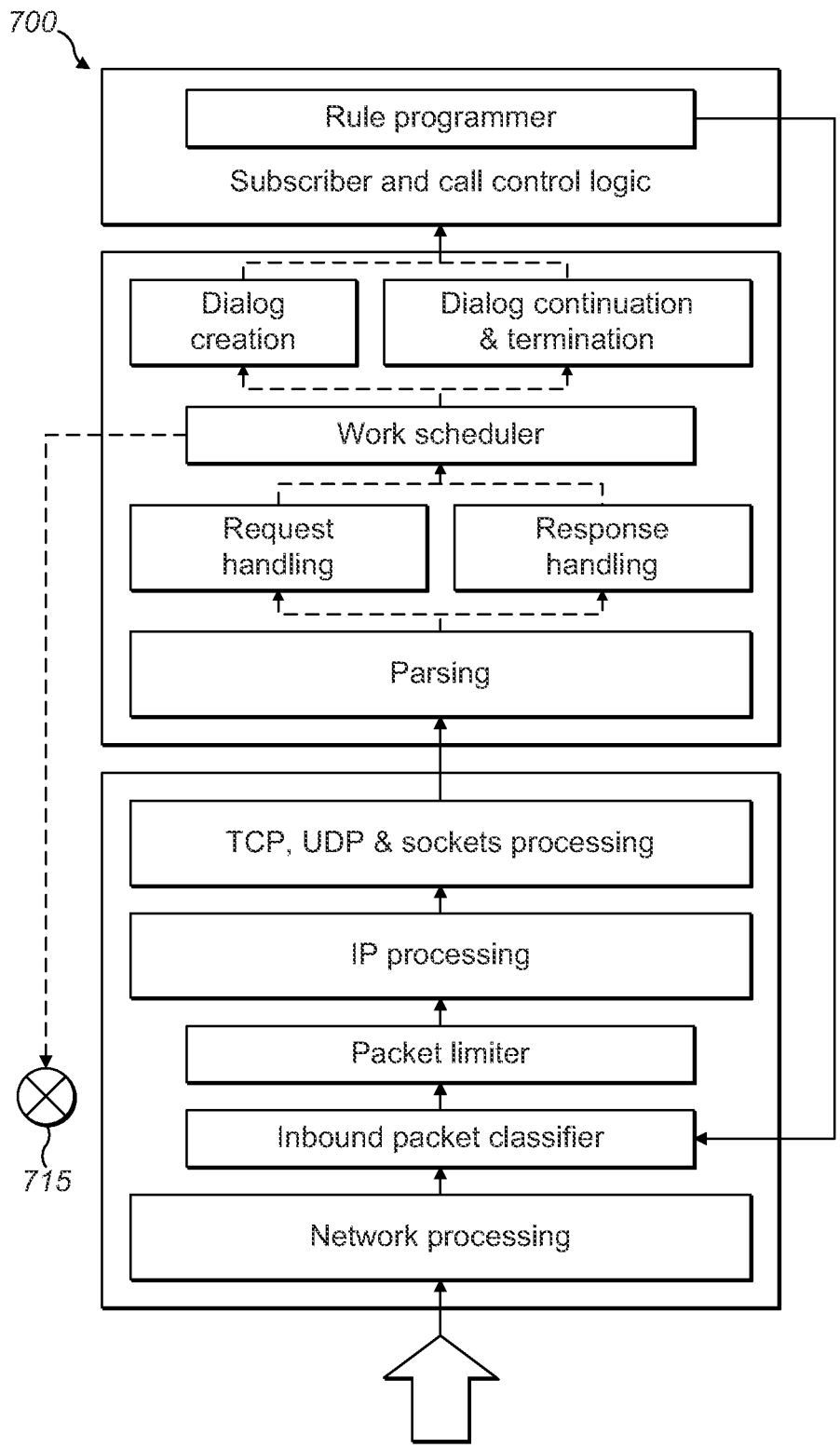
Figure 8:
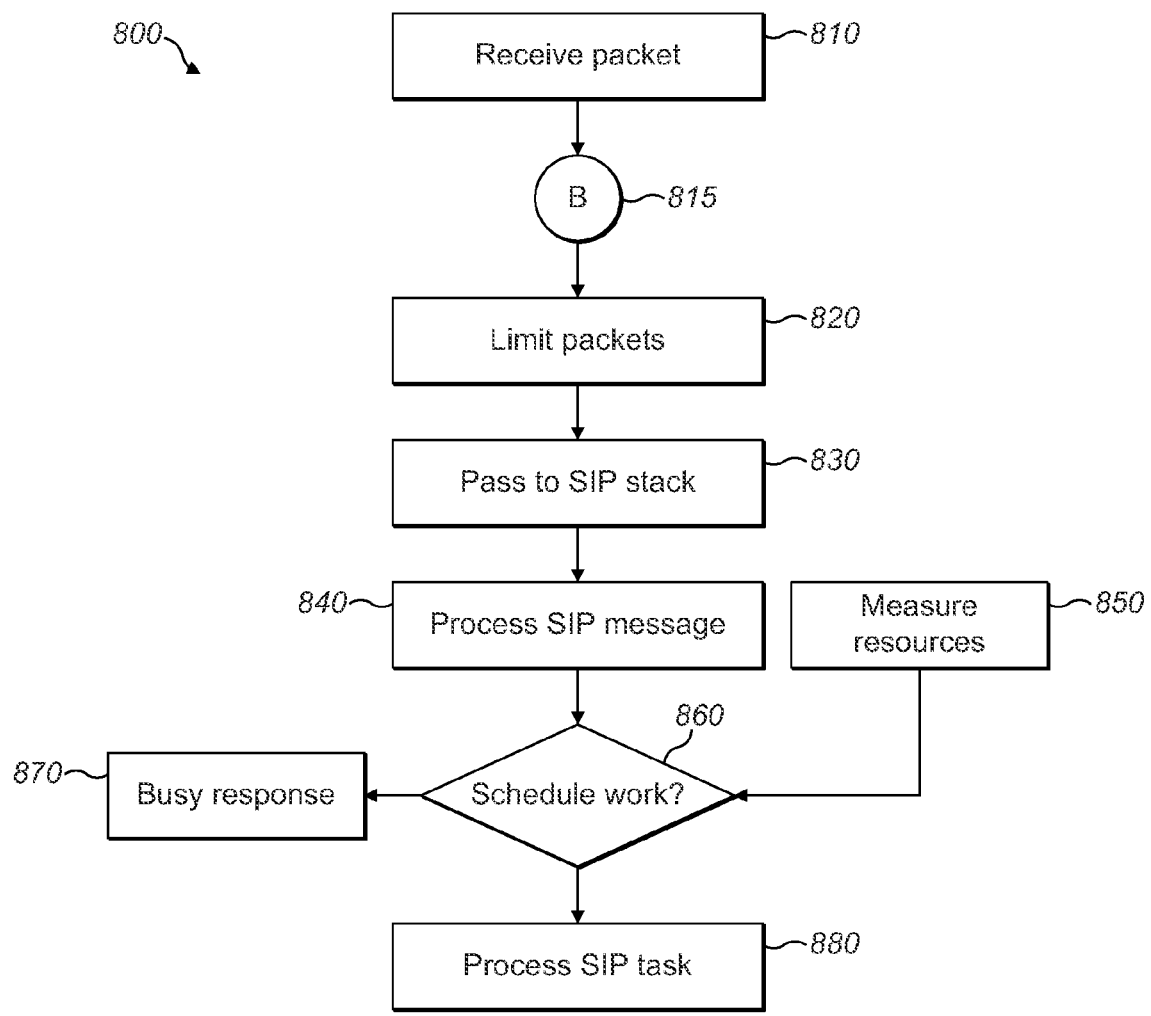
FIG. 8 is a flow chart showing a processing method according to the second example.
Figure 9:
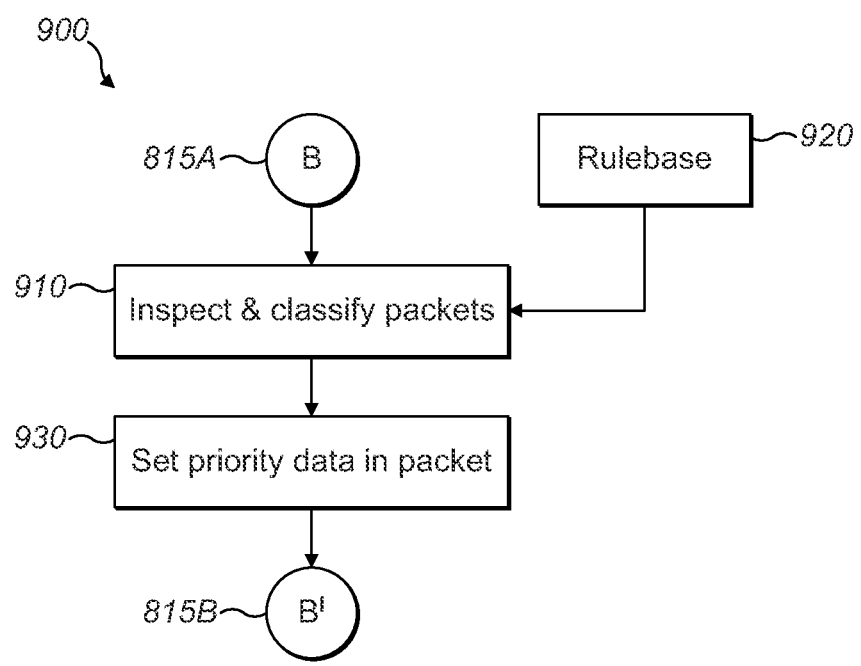
FIG. 9 is a flow chart showing an additional number of steps according to a variation of the method of the second example.

An example of the use of SIP server 700 will now be described with reference to FIGS. 7B, 7C, 8 and 9. Turning to the method 800 of FIG. 8, this begins at step 810 wherein an inbound data packet is received. As with the first example, the inbound data packet is processed by the network processing component 305 before being passed up the stack. If an inbound packet classifier 710 is used then the method proceeds to that of FIG. 9 at point B 815. Turning to FIG. 9, at step 910 the inbound packet classifier 710 inspects and classifies the received packet. The classification may be based on rules or a rulebase provided by rule programmer 740 at step 920. The rules, rulebase or other classification data may also be provided without the use of rule programmer 740. At step 930 a priority associated with the classification is determined and a priority tag is implanted within the data packet. The method then returns to FIG. 8. At step 820, the packet limiter 720 limits incoming packets as described above. This may be based on a priority tag, using the sacrificial algorithm and/or using another limiting procedure, such as that implemented by the access control component 410 of the first example. FIG. 7B illustrates packets being discarded by the packet limiter 720; in this example, the packets are sent to memory garbage disposal 715. If the packet limiter 720 determines not to limit a particular packet, the packet is passed to the SIP stack 330 at step 830 via the remaining components of the IP stack 320. At step 840 initial SIP processing is performed by the SIP stack 330. This may comprise parsing by the parsing component 335 and request and/or response handling by components 345 and 355. This may lead to an item of work being proposed based on the result of the initial SIP processing. At step 860, the work scheduler 730 determines whether and/or when to schedule the item of work. This may be based on a measurement of system resources at step 850 to determine a level of system activity. If there is not enough system capacity to schedule and/or complete the item of work a busy response may be sent at step 870. If there is enough capacity further SIP processing is performed at step 880. This may comprise initiating a SIP transaction or creating a SIP dialog.

The second example enables the limited computing resources of a SIP server to minimise the number of users of SIP services that experience a disruption to that service. It is especially useful when a SIP server is overload, either with legitimate or illegitimate messages. The second example provides a system and method that enables a traffic prioritisation system to be retrofitted to non-priority-aware IP and SIP stacks. In particular, the implementation of a packet limiter at a low level in the IP stack combined with a work scheduler at a high level within the SIP stack produces a synergetic effect greater than their respective individual implementations. For example, the packet limiter prevents protocol time outs and reduces system resource use. This means that not only are there more system resources to commission new items of work, but that these items of work can be intelligently chosen by a work scheduler without interruption by protocol timeouts. In operation, better performance is seen when implementing the two components than provided by the combined result of implementing the components separately.

The above examples are to be understood as illustrative. Further examples are envisaged. For example, a third example may comprise the packet limiter of the second example providing the functions of the access control component of the first example. This combination may increase the effectiveness of the second example to manage DoS or DDoS attacks. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims. Any examples provided in this specification have been provided for the ease of explaining the operation of the present invention and should not be seen as limiting.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A system for managing network communications to a Session Initiation Protocol (SIP) server, comprising:
a processor;
a packet limiter programmatically-located below an Internet Protocol (IP) processing component in an IP processing stack and arranged to, in cooperation with the processor:
receive packets relating to SIP messages from a network;
process the packets; and
selectively forward a subset of the packets to the IP processing component based on the processing,
wherein a packet identifies a source and the packet limiter is arranged to selectively forward packets from a first set of one or more sources in preference to packets from a second set of one of more sources,
wherein the packet limiter is arranged to reassign sources to the first set and the second set following a time interval,
wherein the IP processing component is arranged to perform IP processing and pass processed data from the subset of the packets to a SIP processing stack for initial SIP processing, and
wherein the initial SIP processing comprises parsing SIP messages within the processed data; and
a work scheduler programmatically-located in the SIP processing stack and arranged to, in cooperation with the processor, access the result of the initial SIP processing and determine whether to proceed with further SIP processing of the SIP messages based on a level of system activity.

2. The system according to claim 1, further comprising a packet classifier communicatively coupled between a network connection and the packet limiter, the packet classifier arranged to, in cooperation with the processor, inspect a packet received via the network connection and assign a priority to said packet.

3. The system according to claim 2, further comprising a priority rule programmer arranged to provide one or more classification rules for use by the packet classifier in classifying a packet and assigning a priority.

4. The system according to claim 2, wherein the packet limiter is arranged to selectively forward packets for initial SIP processing based on the priorities assigned by the packet classifier.

5. The system according to claim 2, wherein the packet classifier is adapted to set data in a packet indicating the priority of the packet and the work scheduler is arranged to use the priorities of packets to determine whether to proceed with further SIP processing based on a level of system activity.

6. The system according to claim 1, wherein a ratio of a number of sources in the first set to a number of sources in the second set is selected based a ratio of packets forwarded by the packet limiter to packets received by the packet limiter.

7. The system according to claim 1, wherein the work scheduler is arranged to, based on a current level of system activity, determine whether a new item of work can be scheduled for initiation in a time period, and, if the new item of work process cannot be scheduled for initiation in the time period, send a busy response.

8. The system according to claim 1, wherein the initial SIP processing comprises parsing one or more packets to identify a SIP request and the further SIP processing comprises one or more of proceeding with a SIP transaction following the SIP request and proceeding with a SIP dialog following the SIP request.

9. A method of managing network communications to a Session Initiation Protocol (SIP) server, comprising:
receiving a plurality of packets relating to SIP messages from a network;
processing the plurality of packets in an Internet Protocol (IP) processing stack;
selectively forwarding a subset of the plurality of packets for IP processing in the IP processing stack based on the processing, wherein a packet identifies a source, and wherein selectively forwarding the subset of the plurality of packets comprises:
selectively forwarding packets from a first set of one or more sources in preference to packets from a second set of one of more sources, and
reassigning sources to the first set and the second set following a time interval;
passing processed data from the subset of the plurality of packets from the IP processing stack to a SIP processing stack for initial SIP processing;
performing initial SIP processing in the SIP processing stack, wherein the initial SIP processing comprises parsing SIP messages within the processed data;
determining whether to proceed with further SIP processing in the SIP processing stack based on a level of system activity; and
if so, scheduling further SIP processing.

10. The method according to claim 9, wherein, following the step of receiving the plurality of inbound packets, the method further comprises:
classifying the received packet; and
assigning priorities to the received packets based on said classifying.

11. The method according to claim 10, wherein the step of selectively forwarding one or more of said plurality of packets for SIP processing comprises selectively forwarding one or more packets for SIP processing based on the assigned priorities.

12. The method according to claim 10, wherein the step of scheduling further SIP processing comprises scheduling a first item of work in preference to a second item of work if at least one priority of one or more packets relating to the first item of work is higher than at least one priority of one or more packets relating to the second item of work.

13. The method according to claim 9, wherein a ratio of a number of sources in the first set to a number of sources in the second set is selected based a ratio of forwarded packets to received packets.

14. The method according to claim 9, wherein the step of determining whether to proceed with further SIP processing comprises:
determining whether there are sufficient system resources to initiate a new item of work in a time period; and
if the new item of work cannot be initiated in the time period, sending a busy response.

15. The method according to claim 9, wherein the initial SIP processing comprises parsing one or more packets to identify a SIP request and the further SIP processing comprises one or more of proceeding with a SIP transaction following the SIP request and proceeding with a SIP dialog following the SIP request.

16. A computer program product comprising a non-transitory computer-readable storage medium having computer readable instructions stored thereon, the computer readable instructions being executable by a computerized device to cause the computerized device to perform a method of managing network communications to a Session Initiation Protocol (SIP) server, the method comprising:
  receiving a plurality of packets relating to SIP messages from a network;
  processing the plurality of packets in an Internet Protocol (IP) processing stack;
  selectively forwarding a subset of the plurality of packets for IP processing in the IP processing stack based on the processing, wherein a packet identifies a source and wherein selectively forwarding the subset of the plurality of packets comprises:
    selectively forwarding packets from a first set of one or more sources in preference to packets from a second set of one of more sources, and
    reassigning sources to the first set and the second set following a time interval;
  passing processed data from the subset of the plurality of packets from the IP processing stack to a SIP processing stack for initial SIP processing;
  performing initial SIP processing in the SIP processing stack, wherein the initial SIP processing comprises parsing SIP messages within the processed data;
  determining whether to proceed with further SIP processing in the SIP processing stack based on a level of system activity; and
  if so, scheduling further SIP processing.

* * * * *